(12) United States Patent
Maeda et al.

(10) Patent No.: US 8,005,357 B2
(45) Date of Patent: Aug. 23, 2011

(54) OPTICAL TRANSMISSION APPARATUS

(75) Inventors: Yoshiyuki Maeda, Fukuoka (JP); Hironori Kadota, Fukuoka (JP); Taku Yoshida, Fukuoka (JP); Yoshinobu Matsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 12/038,140

(22) Filed: Feb. 27, 2008

(65) Prior Publication Data

US 2008/0226304 A1 Sep. 18, 2008

(30) Foreign Application Priority Data

Mar. 16, 2007 (JP) ................. 2007-069509

(51) Int. Cl.
*H04B 10/00* (2006.01)
(52) U.S. Cl. ......................... 398/5; 398/167.5
(58) Field of Classification Search ................ 340/2.24, 340/2.26; 700/3; 398/2–3, 167.5, 5
See application file for complete search history.

(56) References Cited

U.S. PATENT DOCUMENTS

| 6,992,978 B1 * | 1/2006 | Humblet et al. ............. 370/228 |
|---|---|---|
| 2003/0043734 A1 | 3/2003 | Takeguchi | | |

FOREIGN PATENT DOCUMENTS

| JP | 61-128302 |  | 6/1986 |
|---|---|---|---|
| JP | 5-235912 | A | 9/1993 |
| JP | 6-30002 |  | 4/1994 |
| JP | 8-202672 |  | 8/1996 |
| JP | 10-327215 | A | 12/1998 |
| JP | 2000-49731 | A | 2/2000 |
| JP | 2002-374229 | A | 12/2002 |
| JP | 2004-112721 | A | 4/2004 |
| JP | 2006-5611 | A | 1/2006 |

OTHER PUBLICATIONS

Japanese Office Action, English-language Translation mailed May 10, 2011 for corresponding Japanese Application No. 2007-069509.

* cited by examiner

*Primary Examiner* — Leslie Pascal
(74) *Attorney, Agent, or Firm* — Fujitsu Patent Center

(57) ABSTRACT

An optical transmission apparatus includes redundant line cards each installed with hardware and a CPU. The hardware obtains failure information on redundant lines including a working line and a protection line, and the CPU determines switching control of the redundant lines based on the obtained failure information. Further, the hardware switches the redundant lines based on switching control determined by the CPU, so as to transmit an SDH/SONET optical signal. In the apparatus, from or to hardware installed in each of the redundant line cards, the failure information obtained by the hardware is communicated to hardware installed in a neighboring line card.

4 Claims, 16 Drawing Sheets

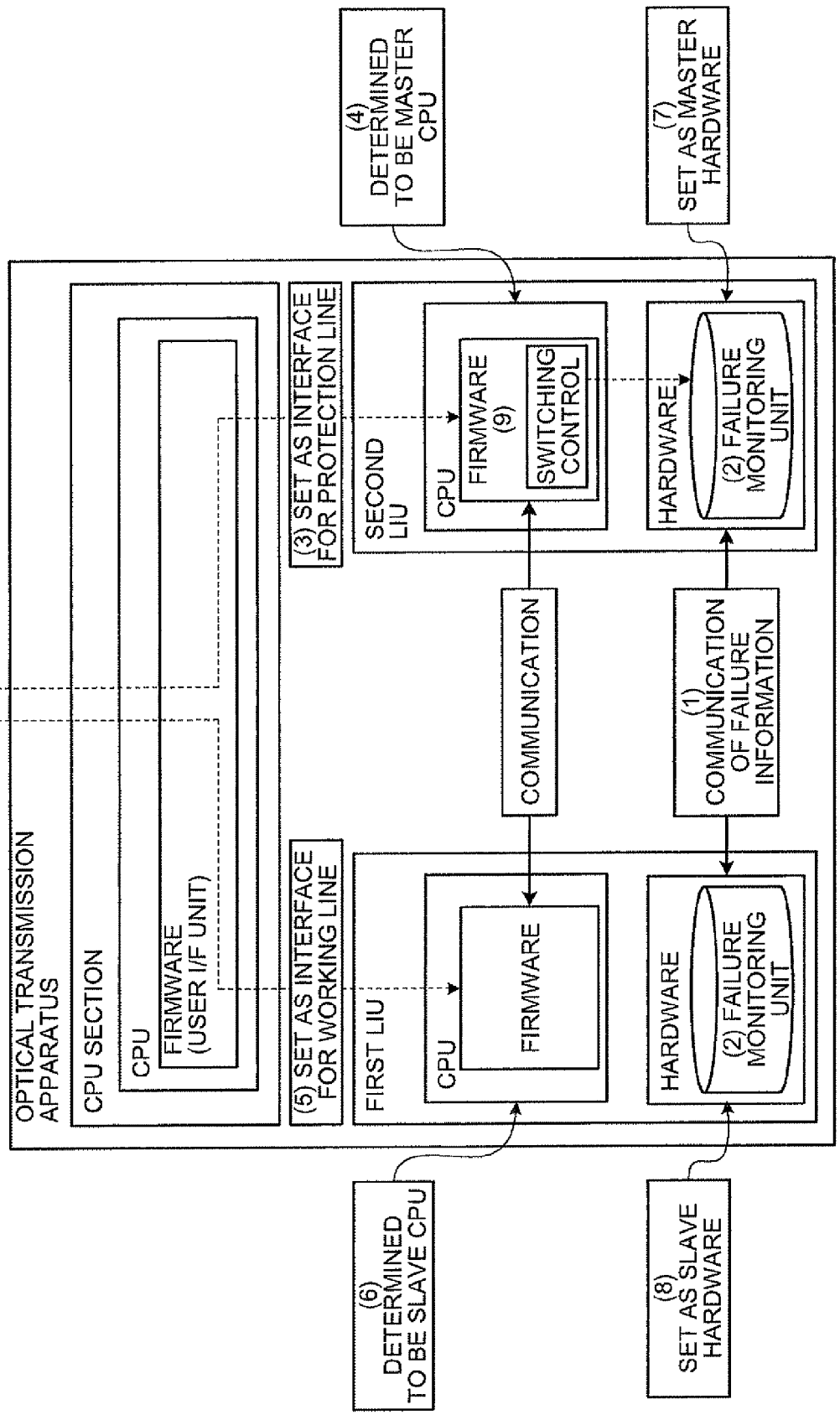

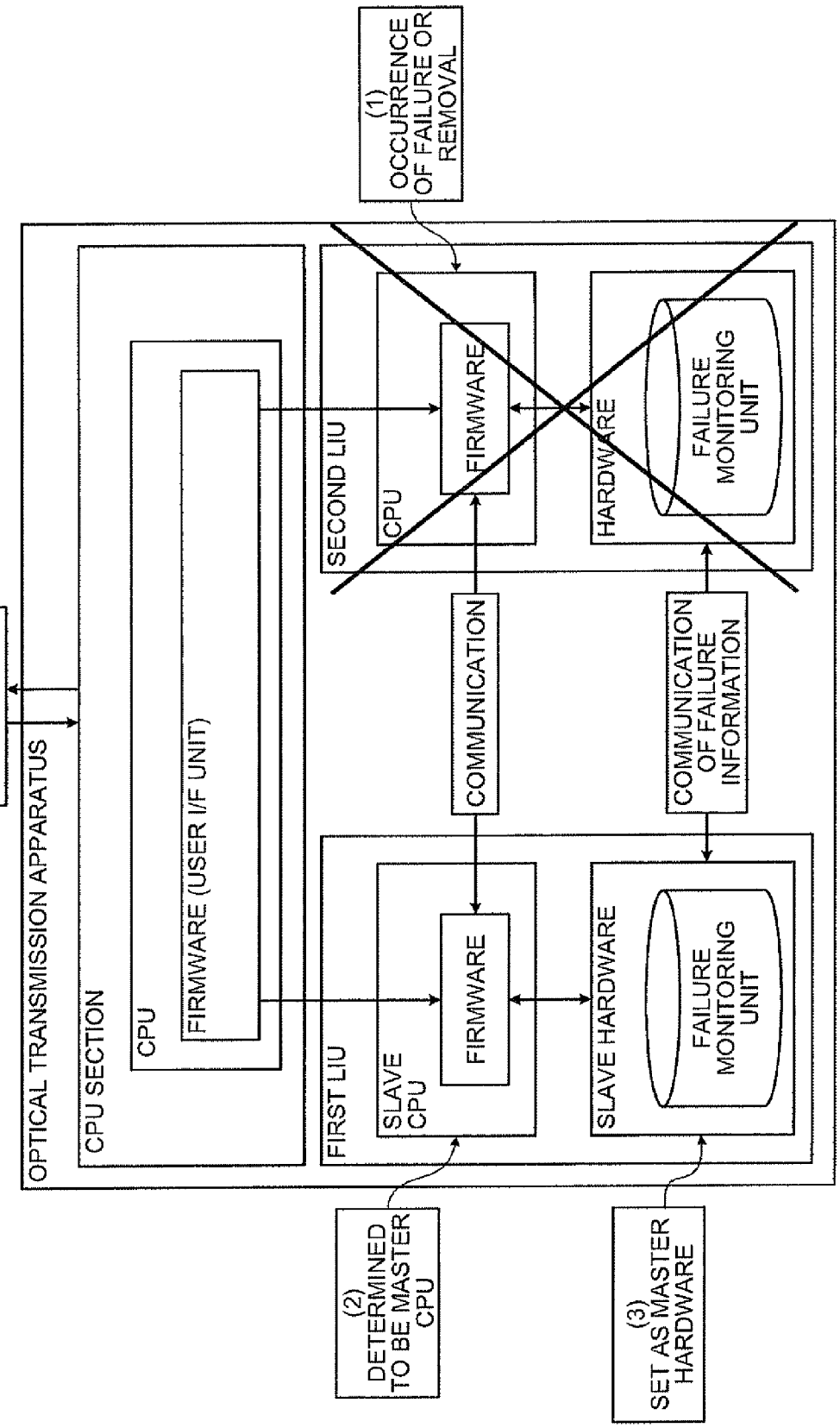

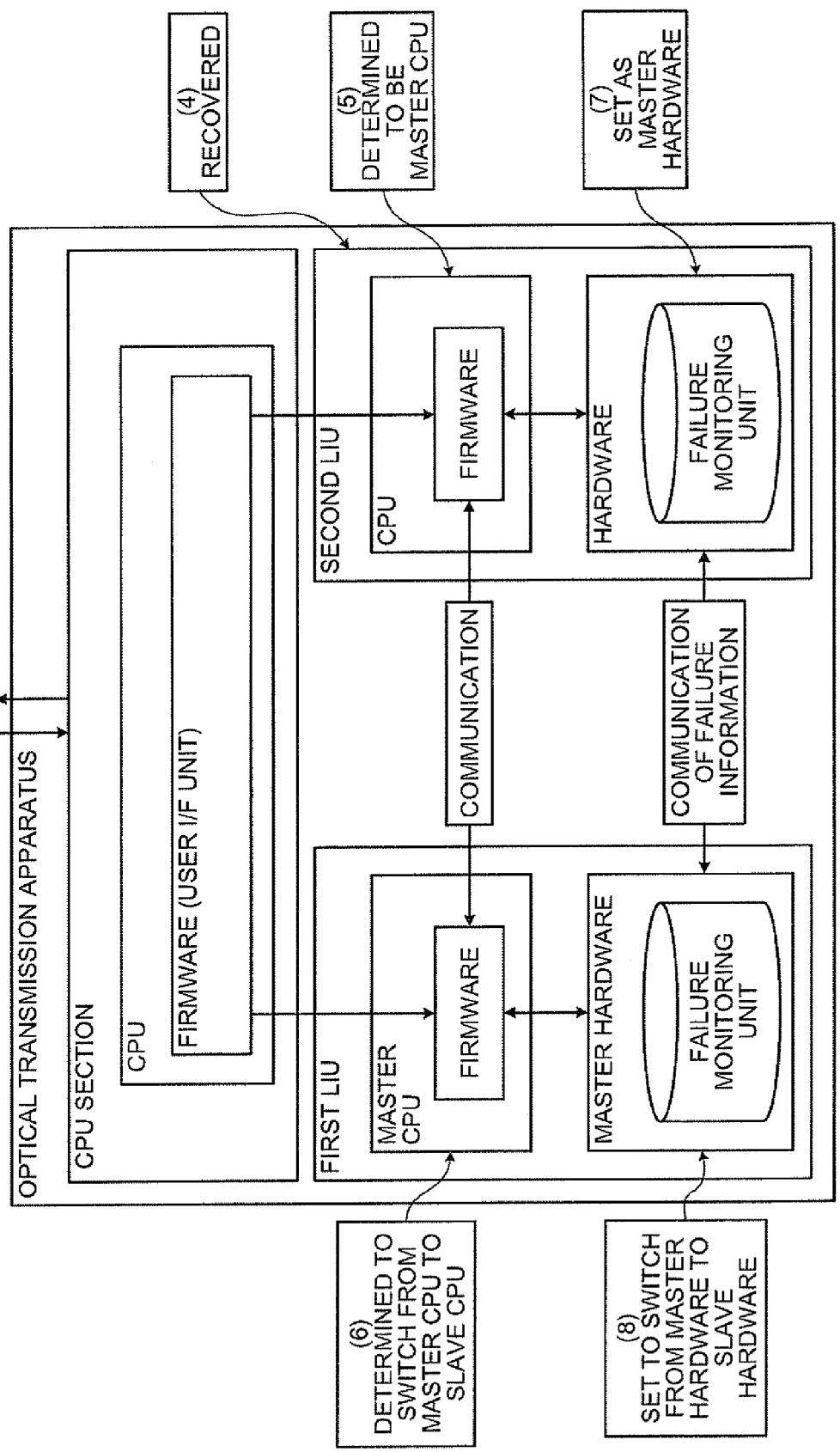

INFORMATION INCLUDED IN DATA

| CONTENTS OF DATA | | BYTE (S) |
|---|---|---|
| APS (K1 #1, K2 #1) | OVERHEAD INFORMATION | 2 |
| LINE ALM INFORMATION (SF, SD) | LINE ALM INFORMATION | 1 |

| INCON APS | | LINE ALM (SF) | | LINE ALM (SD) | |
|---|---|---|---|---|---|
| SELF | PAIR | SELF | PAIR | SELF | PAIR |

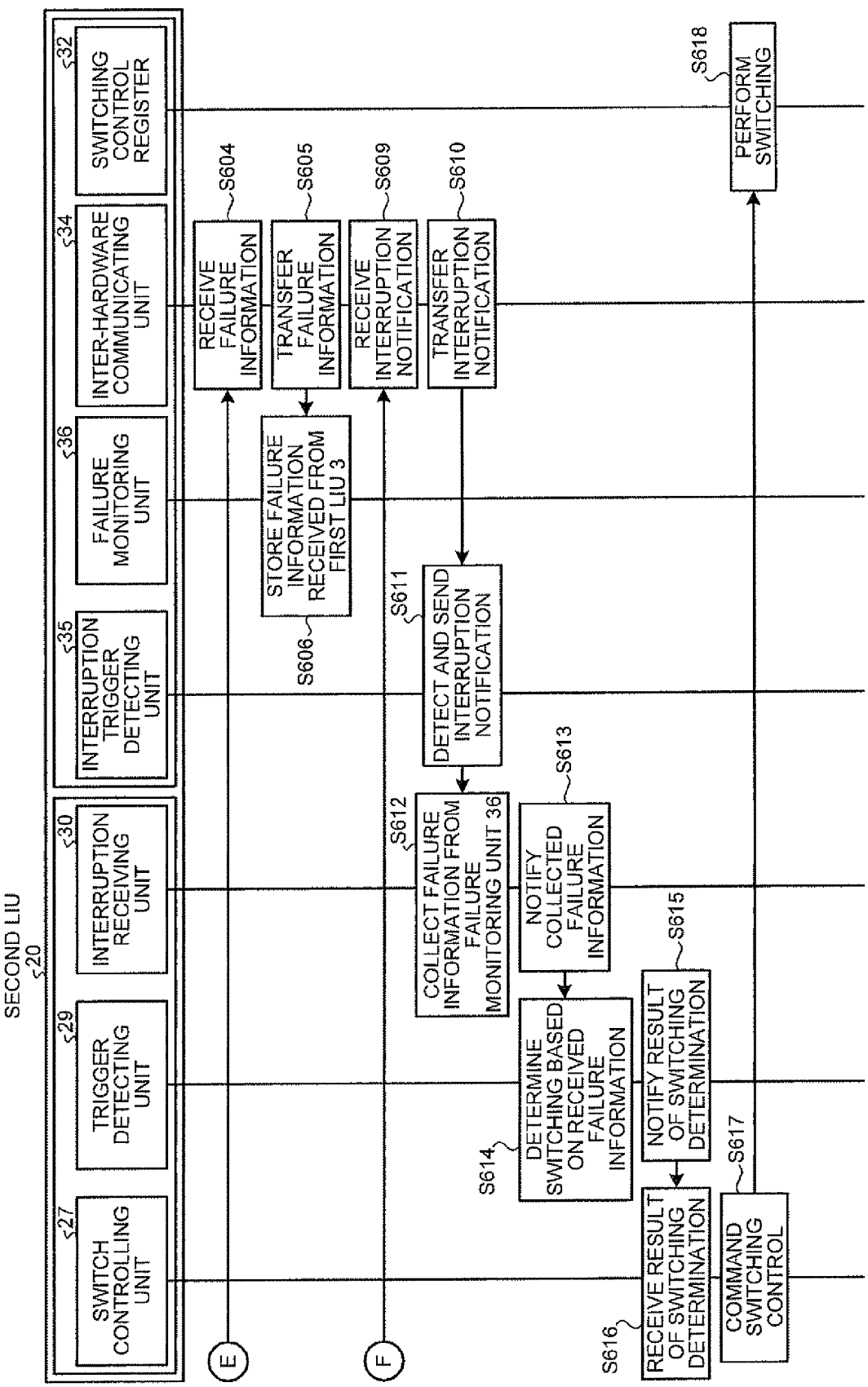

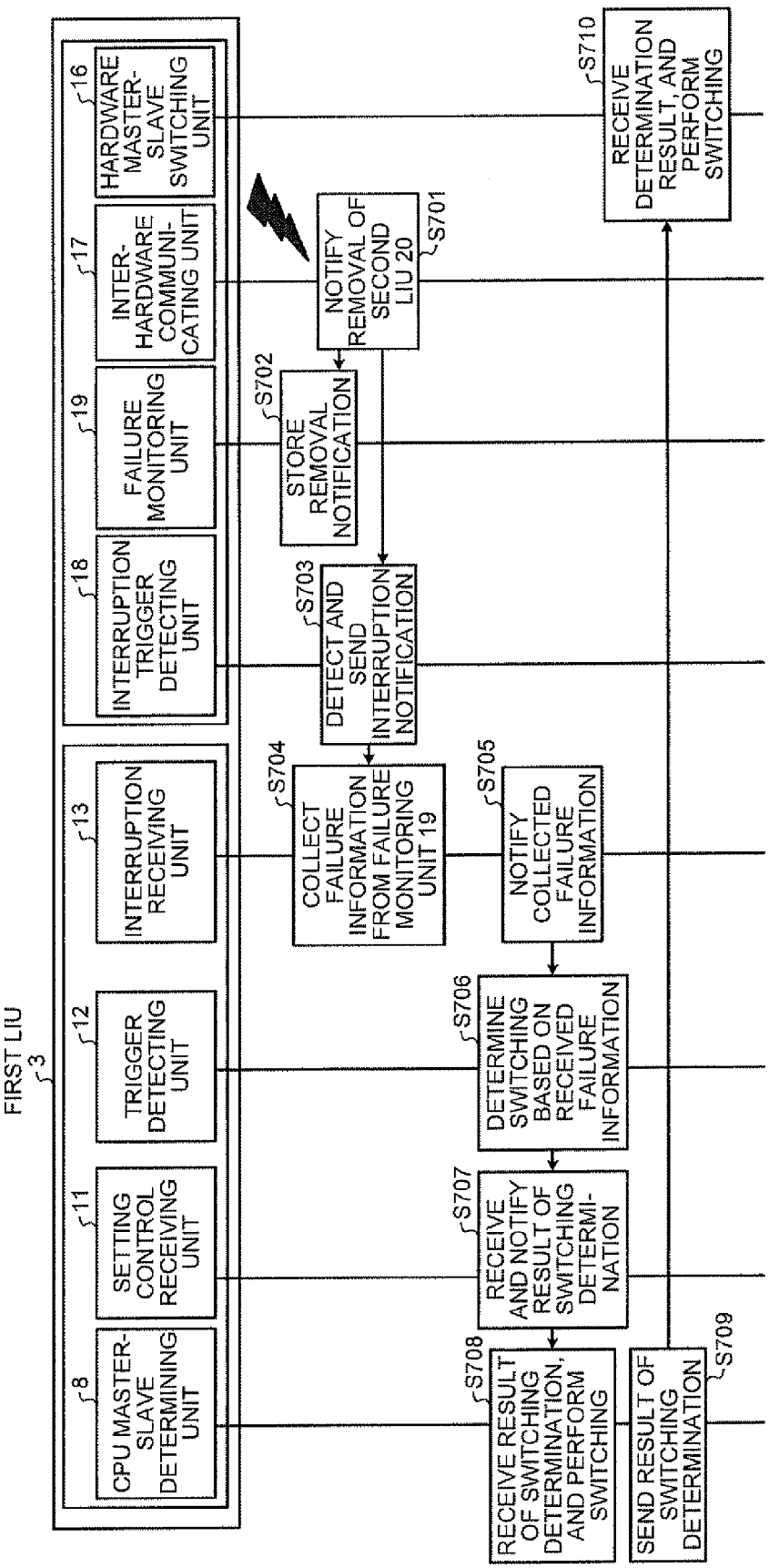

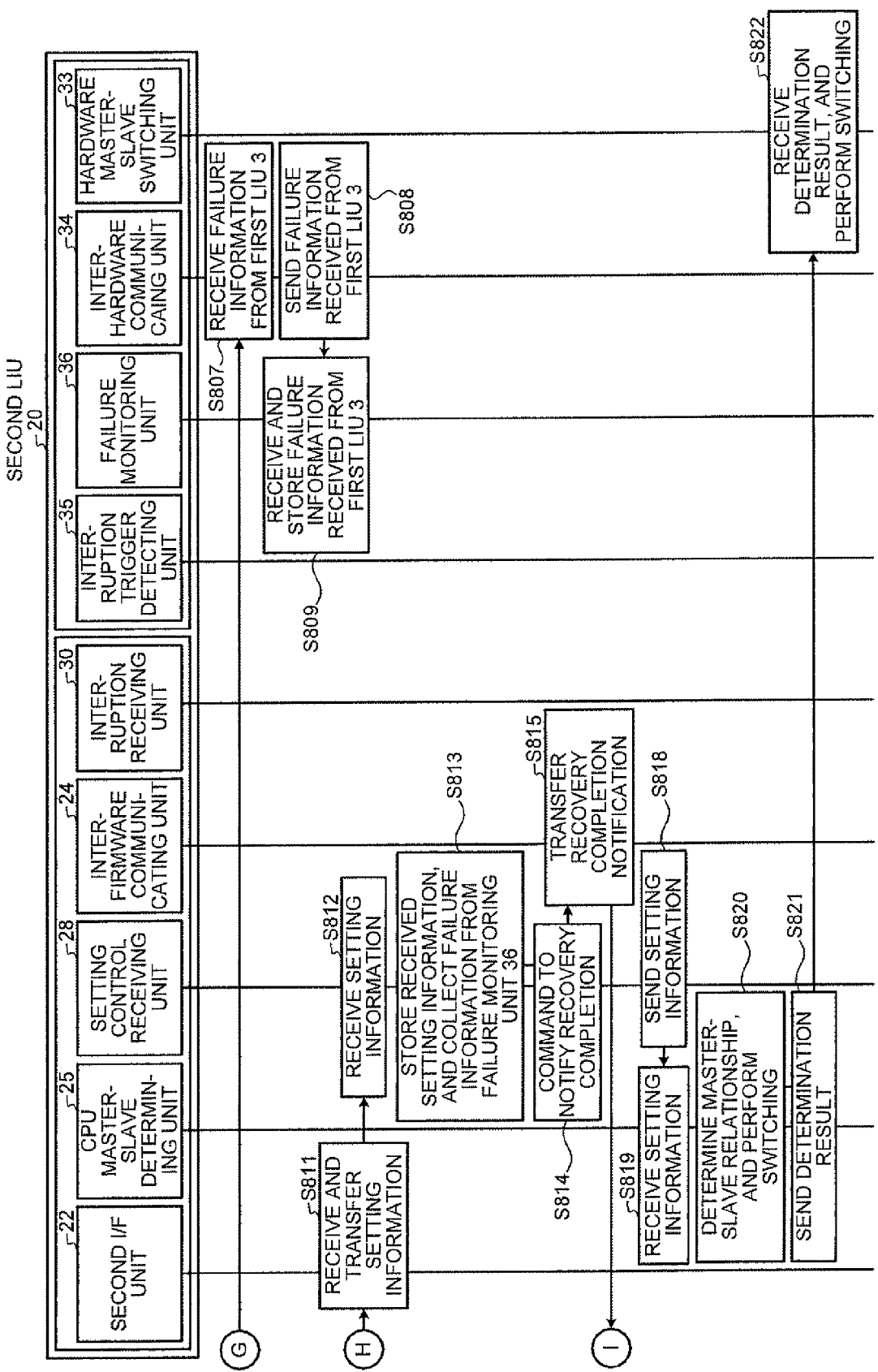

NORMAL OPERATION

NORMAL OPERATION

RECOVERED FROM COMMUNICATION FAILURE

SWITCHED BACK

NORMAL OPERATION

WHEN COMMUNICATION FAILURE OCCURS

OPTICAL TRANSMISSION APPARATUS

BACKGROUND OF THE INVENTION

1. Field of the Invention

The present invention relates to an optical transmission apparatus.

2. Description of the Related Art

In a redundant network configured according to a standard of optical transmission technology such as Synchronous Digital Hierarchy (SDH) or Synchronous Optical Network (SONET), a working line and a protection line are provided between two optical transmission apparatuses. Further, an Automatic Protection Switch (APS) function is provided for switching the working line to the protection line upon the occurrence of failure on the working line, so as to quickly respond to communication failure.

An example of such network configuration implementing the APS function is a network configuration called "1+1 APS" shown in FIGS. 9A to 9D. FIGS. 9A to 9D are schematic drawings for explaining the 1+1 APS.

In the "1+1 APS" as shown in FIGS. 9A to 9D, redundant lines are provided as a working line and a protection line between two optical transmission apparatuses. In the normal operation shown in FIG. 9A, an optical signal from an optical transmission apparatus on the left is forwarded to an optical transmission apparatus on the right over both the working line and the protection line, and a selector (see "SEL" of FIG. 9A) of the right optical transmission apparatus at the receiving end controls switching so as to receive the optical signal only from the working line. An optical signal from the right optical transmission apparatus is forwarded to the left optical transmission apparatus over both the working line and the protection line, and a selector of the left optical transmission apparatus at the receiving end controls switching so as to receive the optical signal only from the working line.

In the "1+1 APS", upon occurrence of communication failure on the working line, a selector of an optical transmission apparatus controls switching so as to receive an optical signal from a neighboring optical transmission apparatus over the protection line. Specifically, as shown in FIG. 9B, switching is performed at the receiving end so that an optical signal sent over the protection line is received as well. In this way, communication failure can be quickly responded only by performing switching control at the receiving end.

After recovery from the communication failure, normal operation may be performed using the protection line as a working line and the recovered working line as a protection line as shown in FIG. 9C, or switching may be performed back again as shown in FIG. 9D.

A network configuration so-called "1:1 APS" has also been known that performs switching control at both the receiving end and the sending end of an optical signal.

Another example of the network configuration implementing the APS function is a ring network as shown in FIGS. 10A and 10B, so-called "Bidirectional Line Switch Ring (BLSR)" that performs switching control of the "1+1 APS". FIGS. 10A and 10B are schematic drawings for explaining the BLSR.

In the normal operation of the "BLSR", an optical signal is communicated using only one way of a communication path as a working direction. When communication failure occurs, the path direction used in the normal operation is switched to the reverse direction (protection direction) so that the communication failure can be quickly responded. As shown in FIG. 10A, for example, in the normal operation of the ring network including four optical transmission apparatuses, i.e. a node 1 to a node 4, an optical signal is sent from the node 4 to a node 2 using a path passing through a node 3.

In this state, when communication failure occurs between the node 4 and the node 3 as shown in FIG. 10B, the node 3 sends information of the communication failure to the node 4 through the node 2 and the node 1. In response to the information of the failure occurrence, the node 4 sends an optical signal to the node 2 using a reverse path direction (protection direction) of the current path direction. Specifically, the optical signal from the node 4 reaches the node 3 through the node 1 and the node 2, and turns around at the node 3 to be sent to the node 2.

In the "1+1 APS" or the "BLSR", an optical transmission apparatus performs switching control of the APS function by exchanging with a neighboring optical transmission apparatus APS bytes (K1/K2 bytes) stored in the overhead of an SDH or a SONET optical signal. For example, when an optical transmission apparatus at the receiving end detects a failure such as a signal failure (SF) or signal degradation (SD), the apparatus notifies information of the failure to a neighboring apparatus using APS bytes storing such information, and performs switching control.

The switching control is performed within 50 milliseconds as required by the GR253 standard.

An example of an architecture realizing the "1+1 APS" or the "BLSR" is a centralized CPU (central processing unit) architecture as shown in FIG. 11. FIG. 11 is a schematic of a centralized CPU architecture.

As shown in FIG. 11, the centralized CPU architecture has a redundant configuration including: a CPU section that controls monitoring an entire optical transmission apparatus; and line interface units (LIUs), i.e., a first LIU and an second LIU, each having an interface function for external lines corresponding to working and protection lines. A user of the optical transmission apparatus sets via the CPU section, for example, the first LIU to be an interface for the working line, and the second LIU to be an interface for the protection line.

Each of the first LIU and the second LIU includes hardware units. The hardware receives APS bytes over the working and the protection lines, and notifies information of SF and SD to the CPU section. The hardware also performs switching in response to a command from the CPU section. Each of the first LIU and the second LIU has a plurality of ports corresponding to the working and the protection lines.

In the centralized CPU architecture, firmware operating in a CPU of the CPU section collects information of the APS bytes from the first LIU and the second LIU, so as to control switching.

For example, when the hardware of the first LIU serving as an interface for the working line detects SF as a switching factor, the hardware notifies the occurrence of the SF to the firmware of the CPU section (see (1) shown in FIG. 11). The firmware of the CPU section then performs an APS determination process (switching determination process), based on the received SF information and the information of APS bytes from the second LIU (see (2) shown in FIG. 11), so as to control switching of the hardware in the first LIU and the second LIU (see (3) shown in FIG. 11). In this way, switching is performed as shown in FIG. 9B or 10B.

In the centralized CPU architecture, when a plurality of switching factors occur concurrently, the CPU section is congested with the APS determination process performed by the firmware, causing a problem that switching cannot be performed quickly for such a communication failure.

The problem is addressed with an architecture realizing a "1+1 APS" or a "BLSR", such as a decentralized or distributed CPU architecture shown in FIG. 12. FIG. 12 is a schematic of a distributed CPU architecture.

As with the centralized CPU architecture, the distributed CPU architecture includes a CPU section, and a first LIU and a second LIU each having an interface function for external lines corresponding to the working and the protection lines, as shown in FIG. 12. Each of the first LIU and the second LIU includes a distributed CPU. Firmware operating in the CPU of one LIU collects information of APS bytes, and communicates it with firmware of the other LIU. Accordingly, information of both LIUs is shared to control switching.

As in the centralized CPU architecture, a user of the optical transmission apparatus sets via the CPU section, for example, the first LIU to be an interface for the working line and the second LIU to be an interface for the protection line. The first LIU receives such setting information via firmware (user I/F unit) in a CPU of the CPU section, and sets itself to be an interface for the working line. Similarly, the second LIU sets itself to be an interface for the protection line.

In the "1+1 APS", as required by the GR253 standard, a CPU in an LIU set as an interface for the protection line (the second LIU in FIG. 12) is automatically set as a master CPU and dominantly controls switching of hardware. Further, a CPU in an LIU set as an interface for the working line (the first LIU in FIG. 12) is set as a slave CPU that relays a command from the master CPU to hardware of the LIU. In the "BLSR", a user selectively sets a master CPU. For example, when the CPU in the second LIU is set as a master CPU, the CPU in the first LIU is set as a slave CPU that relays a command from the master CPU to the hardware of the first LIU.

In the distributed CPU architecture, for example, when the hardware of the first LIU serving as an interface for the working line detects SF as a switching factor, it notifies the occurrence of the SF to the firmware in the CPU of the first LIU (see (1) shown in FIG. 12). The firmware of the first LIU notifies the occurrence of the switching factor to the firmware in the CPU (master CPU) of the second LIU by firmware communication (see (2) shown in FIG. 12). The firmware of the second LIU performs the APS determination process (switching determination process), based on the switching factor (SF) received from the first LIU, the information of APS bytes from the second LIU, and the information indicating that the second LIU acts as the interface for the protection line (see (3) shown in FIG. 12).

The firmware of the second LIU provides a result of the APS determination process as a switching notification to the firmware of the first LIU by firmware communication (see (4) shown in FIG. 12). Based on the result determined by the firmware of the second LIU, the firmware of the first LIU and the firmware of the second LIU control switching of the hardware of their respective LIUs (see (5) shown in FIG. 12). As such, switching is controlled based on the determination made by the CPU of the second LIU serving as a master CPU, and thus performed, for example, as shown in FIG. 9B or 10B.

Japanese Examined Patent Application Publication No. H6-30002 discloses a programmable controller in which data is transferred by direct memory access (DMA) from a memory of a master CPU to a memory of a slave CPU, allowing the CPUs to share information Japanese Patent Application Laid-open No. H8-202672 discloses a distributed multiprocessing system that includes processor units (a single master unit and a plurality of slave units) each including a CPU and a memory, and that allows the CPUs to share information by transferring data from the master unit to the slave units via a VERSAmodule Eurocard (VME) bus.

In the conventional configuration, upon detection of a line failure in an LIU installed with a slave CPU, information of the failure needs to be notified to an LIU installed a master CPU, by firmware communication. Because it takes time to notify a large amount of information to the master CPU, switching cannot be performed quickly.

In the conventional configuration, upon occurrence of failure or removal of an LIU installed with a master CPU, a CPU in a neighboring LIU needs to perform the APS determination process as a master CPU. Because the CPU does not hold information of APS bytes having been collected by the master CPU before the occurrence of the failure or removal, switching cannot be performed properly.

In the related arts, upon recovery of an LIU installed with a CPU set as a master CPU, the CPU in the recovered LIU collects information of APS bytes from a CPU in a neighboring LIU. Because the CPU of the neighboring LIU does not hold information of APS bytes having been collected before the occurrence of the failure or removal, the collected information is incomplete. Thus, switching cannot be performed properly.

Such information of APS bytes is collected by firmware communication, thus taking time to collect the information and failing to perform quick switching. Particularly the "BLSR" having a ring network configuration communicates a larger amount of information compared with the "1+1 APS", thus taking time to collect the information and failing to perform quick switching.

SUMMARY OF THE INVENTION

It is an object of the present invention to at least partially solve the problems in the conventional technology.

According to an aspect of the present invention, an optical transmission apparatus for transmitting an optical SDH/SONET signal in a ring network includes a first line card and a second line card, each including a hardware unit, a CPU, and an inter-hardware communicating unit. The hardware unit obtains failure information on the redundant line. The CPU determines switching control of the redundant line based on the failure information obtained by the hardware unit, and thereby the hardware unit switches the redundant line based on the switching control determined by the CPU. The inter-hardware communicating unit communicates, from the hardware unit of one of the first line card and the second line card to the hardware unit of the other of the first line card and the second line card, the failure information obtained by the hardware of the one of the first line card and the second line card.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A to 1C are schematics of an overview and features of an optical transmission apparatus according to a first embodiment of the present invention;

FIGS. 6A and 6B are charts of processes from the occurrence of failure on a working line to switching control in the optical transmission apparatus shown in FIG. 2;

FIG. 7 is a chart of processes from the removal of an LIU for a protection line to switching control in the optical transmission apparatus shown in FIG. 2;

FIG. 8B is a chart of processes from the recovery of the LIU for the protection line to switching control in the optical transmission apparatus shown in FIG. 2;

DETAILED DESCRIPTION OF THE PREFERRED EMBODIMENTS

Figure 2:
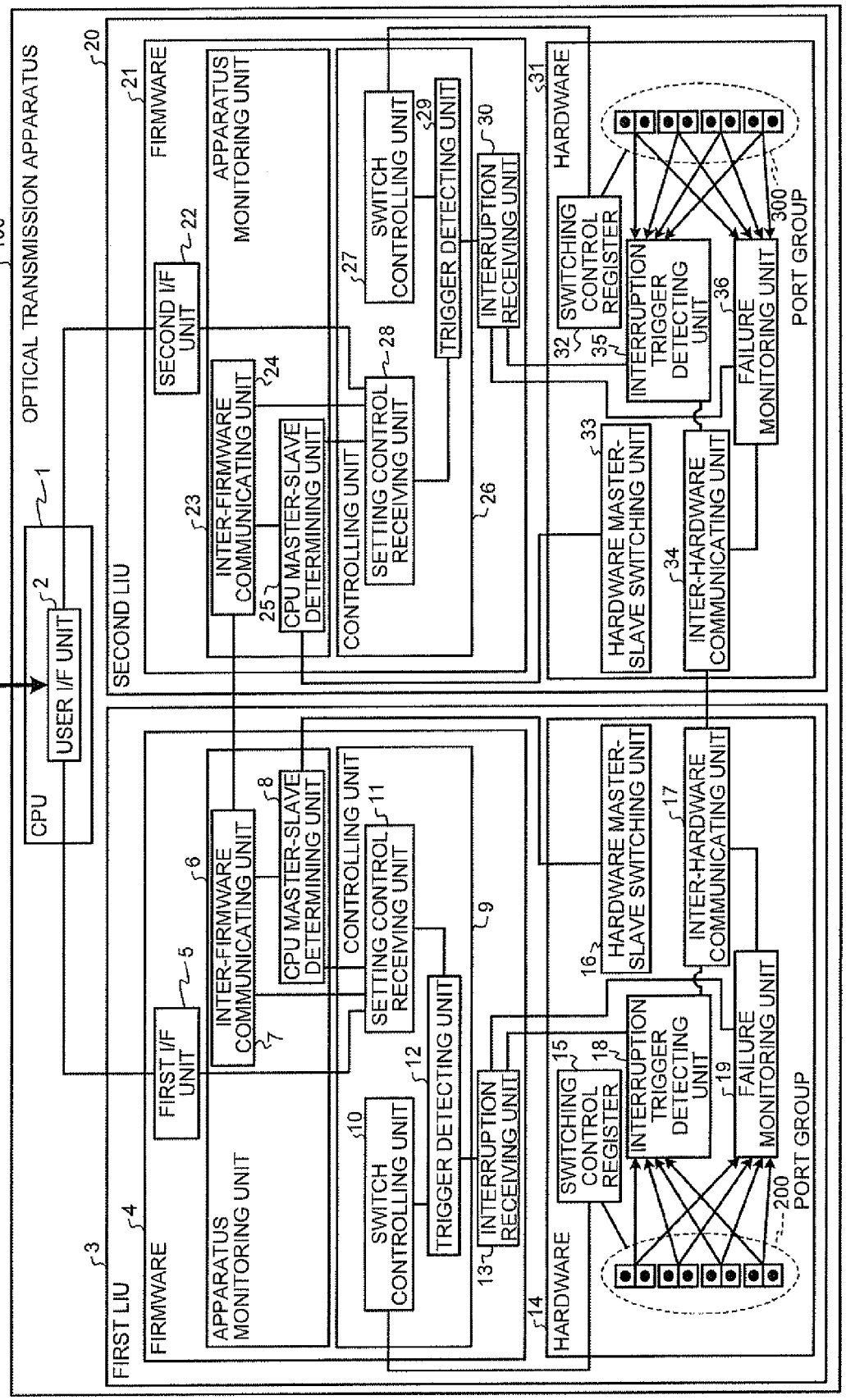
FIG. 2 is a configuration block diagram of the optical transmission apparatus according to the first embodiment.

Exemplary embodiments of an optical transmission apparatus according to the present invention will now be described in detail referring to the accompanying drawings. The description starts from an overview and features of an optical transmission apparatus according to a first embodiment of the present invention, and moves to a configuration and a procedure of the optical transmission apparatus according to the first embodiment, advantages of the first embodiment, and finally another embodiment.

Referring to FIGS. 1A to 1D, the following specifically describes main features of an optical transmission apparatus according to the first embodiment. FIGS. 1A to 1D are schematics of an overview and features of the optical transmission apparatus according to the first embodiment.

In the optical transmission apparatus according to the first embodiment, a hardware unit mounted on a redundant LIU obtains failure information on redundant lines including working and protection lines. Based on the received failure information, a CPU mounted on the redundant LIU determines switching control of the redundant lines, and the hardware switches the redundant lines based on the switching control determined by the CPU. In this way, an SDH/SONET optical signal is transmitted. Specifically, in an optical transmission apparatus having a distributed CPU architecture shown in FIG. 12, an SDH/SONET optical signal is transmitted. The "LIU" may be referred to as a "line card".

The optical transmission apparatus according to the first embodiment has such a main feature as being capable of performing quick switching. The main feature is briefly described as follows. In the optical transmission apparatus according to the first embodiment, between pieces of hardware installed in redundant LIUs, hardware installed in one redundant LIU communicates obtained failure information to hardware installed in the other LIU.

Specifically, as shown in (1) in FIG. 1A, inter-hardware communication is performed such that hardware of the first LIU communicates obtained failure information to hardware of the second LIU, and that the hardware of the second LIU communicates obtained failure information to the hardware of the first LIU.

In the optical transmission apparatus according to the first embodiment, hardware in each redundant LIU stores therein obtained failure information and failure information received from hardware in a neighboring LIU.

Specifically, as shown in (2) of FIG. 1A, hardware in each of the first and the second LIUs includes a failure monitoring unit that stores therein failure information obtained by the hardware. Failure information obtained by hardware in each of the first and the second LIUs is updated and shared therebetween by inter-hardware communication.

In the optical transmission apparatus according to the first embodiment, when a predetermined input section receives line setting information that each of the redundant LIUs is an interface for a working line or a protection line, a CPU in an LIU set as an interface for the protection line is determined to be a master CPU, and a CPU in an LIU set as an interface for the working line is determined to be a slave CPU.

Specifically, in the optical transmission apparatus according to the first embodiment, when a user I/F unit in the CPU receives from the user setting information that the second LIU is an interface for the protection line as shown in (3) in FIG. 1A, the CPU of the second LIU is determined to be a master CPU (see (4) in FIG. 1A). When the user I/F unit receives from the user setting information that the first LIU is an interface for the working line as shown in (5) in FIG. 1A, the CPU of the first LIU is determined to be a slave CPU (see (6) in FIG. 1A).

In the optical transmission apparatus according to the first embodiment, the CPU set as the master CPU sets: hardware working under the master CPU to be master hardware; and hardware working under the slave CPU to be slave hardware.

Specifically, the CPU of the second LIU, determined to be the master CPU, sets the hardware working under the master CPU to be master hardware (see (7) in FIG. 1A), and the CPU of the first LIU, determined to be the slave CPU, sets the hardware working under the slave CPU to be slave hardware (see (8) in FIG. 1A).

In the optical transmission apparatus according to the first embodiment, the CPU determined to be the master CPU controls the hardware set as the master hardware to switch the redundant lines. Specifically, as shown in (9) in FIG. 1A, firmware operating in the CPU of the second LIU set as the master CPU dominantly controls switching, and the master hardware working under the master CPU switches the working and the protection lines, in response to switching controlled by the firmware.

In the optical transmission apparatus according to the first embodiment, upon occurrence of failure or removal of the LIU installed with the CPU determined to be the master CPU, the slave CPU is determined to be a new master CPU.

Specifically, upon occurrence of failure or removal of the second LIU installed with the CPU determined to be the master CPU in (4) in FIG. 1A (see (1) in FIG. 1B), the CPU (slave CPU) installed in the first LIU is determined to be a new master CPU (see (2) in FIG. 1B).

The CPU of the first LIU, determined to be the new master CPU, sets the hardware (slave hardware) working under the CPU to be master hardware as shown in (3) in FIG. 1B.

In the optical transmission apparatus according to the first embodiment, when the LIU installed with the CPU determined to be the master CPU is recovered from failure or removal, the CPU is redetermined to be the master CPU.

Specifically, when the second LIU installed with the CPU determined to be the master CPU in (4) in FIG. 1A is recovered from failure or removal (see (4) in FIG. 1C), setting information stored in the CPU of the CPU section (setting information that the second LIU is an interface for the protection line) is received again, and the CPU of the second LIU is redetermined to be the master CPU (see (5) in FIG. 1C). The CPU of the first LIU, when receiving the determination result by firmware communication, determines to switch itself from a master CPU to a slave CPU (see (6) in FIG. 1C).

The CPU of the second LIU sets the hardware working under the CPU to be master hardware as shown in (7) in FIG. 1C, whereas the CPU of the first LIU switches the setting of the hardware working under the CPU from master hardware to slave hardware as shown in (8) in FIG. 1C.

As such, in the optical transmission apparatus according to the first embodiment, transmission of failure information stored in APS bytes can be realized at a higher speed, compared with a transmission between the CPUs (pieces of firmware) installed in the redundant LIUs. Thus, quick switching can be performed as described as the main feature.

Figures 3, 4:
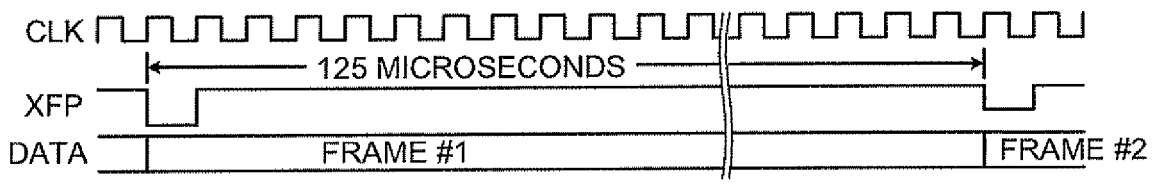
FIG. 3 is a schematic of an inter-hardware communicating unit shown in FIG. 2.
FIG. 4 is a schematic of an interruption receiving unit shown in FIG. 2.

Referring to FIGS. 2 to 4, the following describes a configuration of the optical transmission apparatus according to the first embodiment. FIG. 2 is a configuration block diagram of the optical transmission apparatus according to the first embodiment. FIG. 3 is a schematic of an inter-hardware communicating unit according to the first embodiment. FIG. 4 is a schematic of an interruption receiving unit according to the first embodiment.

As shown in FIG. 2, an optical transmission apparatus 100 according to the first embodiment includes a CPU 1, and redundant LIUs: a first LIU 3 and a second LIU 20.

The CPU 1 includes a user I/F unit 2. The user I/F unit 2 controls to transfer, from a user of the optical transmission apparatus 100 to the first LIU 3 and the second LIU 20, setting information such as "setting the first LIU to be an interface for a working line" or "setting the second LIU to be an interface for a protection line".

The first LIU 3 includes firmware 4 and hardware 14. The firmware 4 operates in a CPU installed in the first LIU 3, and controls switching of the lines. The hardware 14 in the first LIU 3 detects failure information on the lines from a port group 200, or performs switching in response to the switching controlled by the firmware 4.

The firmware 4 includes a first I/F unit 5, an apparatus monitoring unit 6, a controlling unit 9, and an interruption receiving unit 13.

The first I/F unit 5 transfers information received from the user I/F unit 2 to a setting control receiving unit 11 described later.

The apparatus monitoring unit 6 includes an inter-firmware communicating unit 7, and a CPU master-slave determining unit 8. The inter-firmware communicating unit 7 communicates various kinds of information (e.g., setting information for line interface) with firmware 21 of the second LIU 20. The CPU master-slave determining unit 8 determines a CPU containing the firmware 4 to be a master CPU or a slave CPU, based on information received from the setting control receiving unit 11 (described later).

The controlling unit 9 includes a switch controlling unit 10, the setting control receiving unit 11, and a trigger detecting unit 12.

The setting control receiving unit 11 receives and stores therein setting information transferred from the first I/F unit 5, transfers setting information stored in the inter-firmware communicating unit 7 or the CPU master-slave determining unit 8, receives and stores therein setting information transferred from the inter-firmware communicating unit 7, or transfers a result of switching determination made by the trigger detecting unit 12 to the CPU master-slave determining unit 8.

The trigger detecting unit 12 receives failure information collected by the interruption receiving unit 13 (described later), determines switching, and notifies a result of the switching determination to the switch controlling unit 10 (described later).

The switch controlling unit 10 receives the result of the switching determination made by the trigger detecting unit 12, and commands a switching control register 15 (described later) to control switching.

The interruption receiving unit 13 receives an interruption notification from an interruption trigger detecting unit 18 (described later), and collects failure information stored in a failure monitoring unit 19 (described later). As shown in FIG. 4, for example, the interruption receiving unit 13 collects from the failure monitoring unit 19 information of the first LIU 3 (SELF) and the second LIU 20 (PAIR), such as "inconsistency in APS information, INCON APS", "line failure: signal failure, LINE ALM (SF)", and "line failure: signal degradation, LINE ALM (SD)".

The hardware 14 includes the switching control register 15, a hardware master-slave switching unit 16, an inter-hardware communicating unit 17, the interruption trigger detecting unit 18, and the failure monitoring unit 19.

The failure monitoring unit 19 receives and stores therein failure information stored in APS bytes and sent from the port group 200. Further, the failure monitoring unit 19 receives and stores therein failure information, received at hardware of a neighboring LIU (hardware 31 of the second LIU 20) and passed through the inter-hardware communicating unit 17 (described later). The failure monitoring unit 19 may be referred to as an "obtained failure information storing unit".

The inter-hardware communicating unit 17 communicates failure information obtained by hardware in each redundant LIU to hardware in a neighboring line card.

Specifically, the inter-hardware communicating unit 17 sends to an inter-hardware communicating unit 34 of the second LIU 20 failure information stored in the failure monitoring unit 19 and an interruption notification detected by the interruption trigger detecting unit 18 (described later). Further, the inter-hardware communicating unit 17 receives from the inter-hardware communicating unit 34 failure information stored in the failure monitoring unit 36 of the second LIU 20, and an interruption notification detected by an interruption trigger detecting unit 35 (described later). As shown in FIG. 3, for example, in synchronization with a clock (CLK), the inter-hardware communicating unit 17 communicates failure information at a high speed, in a communication time of 125 microseconds for one data frame. Data is configured to have overhead information of APS bytes (K1 bytes or K2 bytes) using two bytes, and LINE ALM information of SF or SD information using 1 byte.

As with the failure monitoring unit 19, the interruption trigger detecting unit 18 receives failure information included in APS bytes from the port group 200, detects the failure information as an interruption notification, and sends the interruption notification to the interruption receiving unit 13. The interruption trigger detecting unit 18 sends the detected interruption notification to the second LIU 20 using the inter-hardware communicating unit 17.

The hardware master-slave switching unit 16 sets the hardware 14 to be either master hardware or slave hardware, based on a result determined by the CPU master-slave determining unit 8. The hardware master-slave switching unit 16 may be referred to as a "hardware master-slave setting unit".

The switching control register 15 performs switching according to a command from the switch controlling unit 10. For example, the switching control register 15 performs switching according to a command from the switch controlling unit 10, so as to receive an optical signal over a protection line, not a working line.

As shown in FIG. 2, the neighboring second LIU 20 has the same structure as the first LIU 3, and components of the second LIU 20 are the same as those of the first LIU 3 regarding functionality. Thus, description of such components will not be repeated here.

Specific operations of the components will be described below.

Referring to FIGS. 5 to 8, the following describes processes performed by the optical transmission apparatus according to the first embodiment. FIGS. 5A and 5B are charts of processes from setting to normal operation in the optical transmission apparatus according to the first embodiment, and FIGS. 6A and 6B are charts of processes from occurrence of failure on the working line to switching control in the optical transmission apparatus according to the first embodiment. FIG. 7 is a chart of processes from removal of an LIU for the protection line to switching control in the optical transmission apparatus according to the first embodiment, and FIGS. 8A and 8B are charts of processes from recovery of an LIU for the protection line to switching control in the optical transmission apparatus according to the first embodiment.

When a user of the optical transmission apparatus 100 according to the first embodiment inputs to the CPU 1 a setting that the first LIU 3 is an interface for the working line (Step S501), the user I/F unit 2 transfers the received setting information to the first LIU 3 (Step S502), and the first I/F unit 5 of the first LIU 3 transfers the setting information to the setting control receiving unit 11 (Step S503).

Specifically, when the user inputs to the CPU 1 an APS availability setting command (LINESET=Work line) for setting the first LIU 3 to be an interface for the working line, the setting information is transferred to the setting control receiving unit 11 via the user I/F unit 2 and the first I/F unit 5.

The setting control receiving unit 11, when receiving the setting information (Step S504), stores therein the received setting information (Step S505) while commanding the inter-firmware communicating unit 7 to notify the received setting information to the second LIU 20 (Step S506). Accordingly, the inter-firmware communicating unit 7 notifies the setting information to an inter-firmware communicating unit 24 (Step S507).

The inter-firmware communicating unit 24, when receiving the setting information from the inter-firmware communicating unit 7, transfers the setting information to a setting control receiving unit 28 (Step S508). The setting control receiving unit 28 receives the setting information (Step S509), and stores therein the received setting information (Step S510).

In this way, the firmware 4 in the CPU of the first LIU 3 stores therein information that the first LIU 3 has been set as an interface for the working line. By firmware communication, the firmware 21 in the CPU of the second LIU 20 receives and stores therein the information that the first LIU 3 has been set as an interface for the working line.

When the user of the optical transmission apparatus 100 according to the first embodiment inputs to the CPU 1 a setting that the second LIU 20 is an interface for the protection line (Step S511), the user I/F unit 2 transfers the received setting information to the second LIU 20 (Step S512), and a second I/F unit 22 of the second LIU 20 transfers the setting information to the setting control receiving unit 28 (Step S513).

Specifically, when the user inputs to the CPU 1 an APS availability setting command (LINESET=Protection line) for setting the second LIU 20 to be an interface for the protection line, the setting information is transferred to the setting control receiving unit 28 via the user I/F unit 2 and the second I/F unit 22.

The setting control receiving unit 28, when receiving the setting information (Step S514), stores therein the received setting information (Step S515) while commanding the inter-firmware communicating unit 24 to notify the received setting information to the first LIU 3 (Step S516). Accordingly, the inter-firmware communicating unit 24 notifies the setting information to the inter-firmware communicating unit 7 (Step S517).

The inter-firmware communicating unit 7, when receiving the setting information from the inter-firmware communicating unit 24, transfers the setting information to the setting control receiving unit 11 (Step S518). The setting control receiving unit 11 receives the setting information (Step S519), and stores therein the received setting information (Step S520).

In this way, the firmware 21 in the CPU of the second LIU 20 receives and stores therein information that the second LIU 20 has been set as an interface for the protection line. By firmware communication, the firmware 4 in the CPU of the first LIU 3 receives and stores therein the information that the second LIU 20 has been set as an interface for the working line.

The setting control receiving unit 28, having received and stored therein the information that the second LIU 20 has been set as an interface for the protection line, sends the setting information to a CPU master-slave determining unit 25 (Step S521). The CPU master-slave determining unit 25 receives the information that the second LIU 20 has been set as an interface for the protection line (Step S522), and determines a master-slave relationship of the CPU containing the firmware 21, so as to perform switching (Step S523).

Specifically, because the second LIU 20 has been set as an interface for the protection line, the CPU master-slave determining unit 25 determines the CPU containing the firmware 21 to be a master CPU. Because the CPU in the LIU is initially set as a master CPU, no switching actually occurs.

The CPU master-slave determining unit 25 sends the determination result to a hardware master-slave switching unit 33 (Step S524). In response to the determination result, the hardware master-slave switching unit 33 performs switching of the hardware 31 (Step S525).

Specifically, because the CPU containing the firmware 21 has been determined to be a master CPU, the hardware master-slave switching unit 33 in the hardware 31 switches the hardware 31 to be master hardware.

The CPU master-slave determining unit 25, having determined the CPU containing the firmware 21 to be a master CPU, commands the inter-firmware communicating unit 24 to provide the first LIU 3 with a notification for switching a master-slave relationship (Step S526). The inter-firmware communicating unit 24 sends the switching notification to the inter-firmware communicating unit 7 (Step S527), and the inter-firmware communicating unit 7 transfers the received switching notification to the CPU master-slave determining unit 8 (Step S528).

The CPU master-slave determining unit 8 receives the switching notification based on the determination result made by the CPU master-slave determining unit 25, and performs switching (Step S529). Because the CPU containing the firmware 21 has been determined to be a master CPU, the CPU master-slave determining unit 8 switches the CPU containing the firmware 4 to be a slave CPU. Specifically, the CPU master-slave determining unit 8 shifts the setting of the CPU containing the firmware 4 from the initial master CPU to a slave CPU.

The hardware master-slave switching unit 16 receives the switching notification from the CPU master-slave determining unit 8, and performs switching of the hardware 14 (Step S530). Specifically, because the CPU containing the firmware 4 has been switched to be a slave CPU, the hardware master-slave switching unit 16 in the hardware 14 switches the hardware 14 to be slave hardware.

This process allows the firmware 21 to control the hardware 31 and the hardware 14, allowing the optical transmission apparatus 100 to be in normal operational state.

Figure 5A:
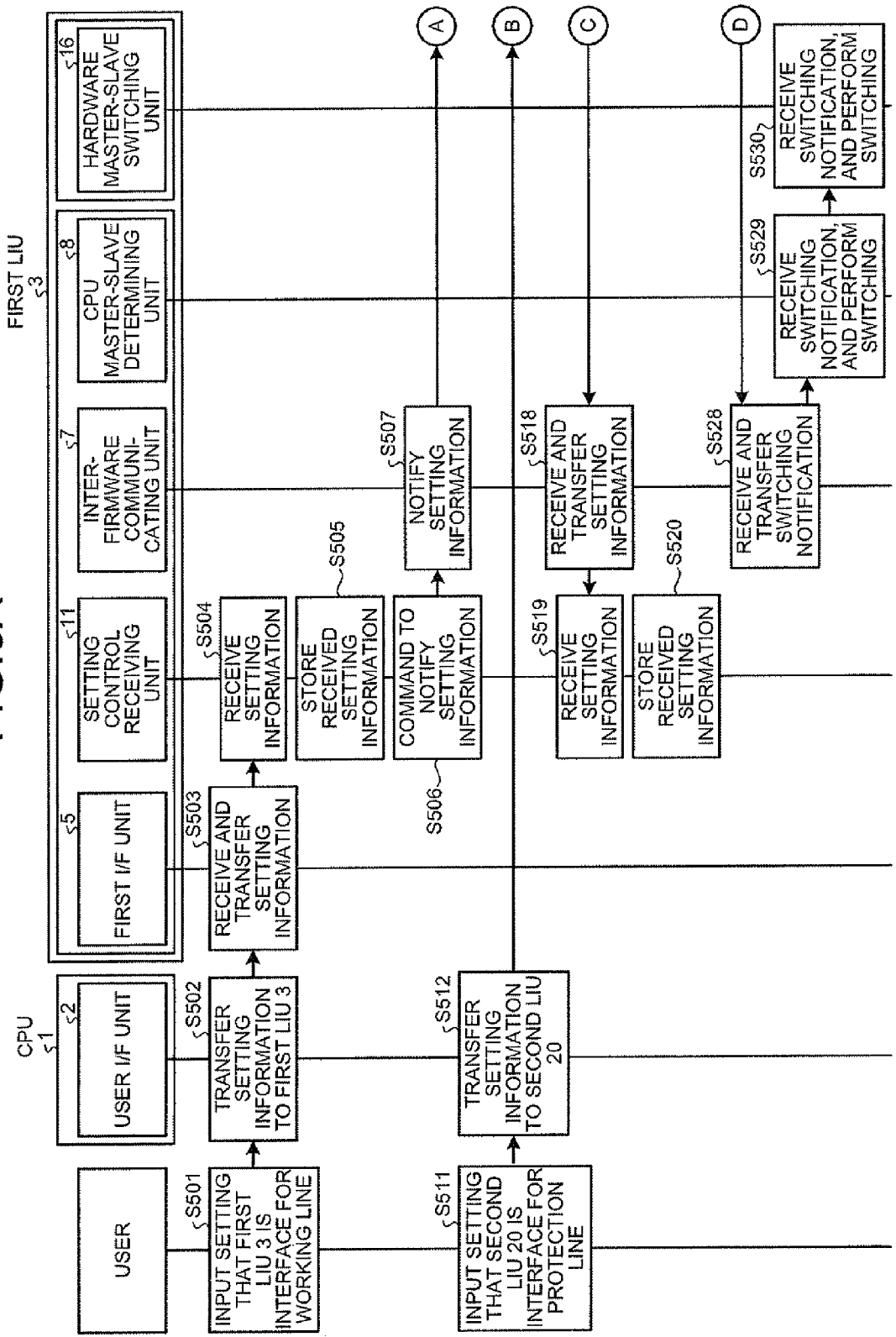
FIGS. 5A and 5B are charts of processes from setting to normal operation in the optical transmission apparatus shown in FIG. 2.
Figure 5B:
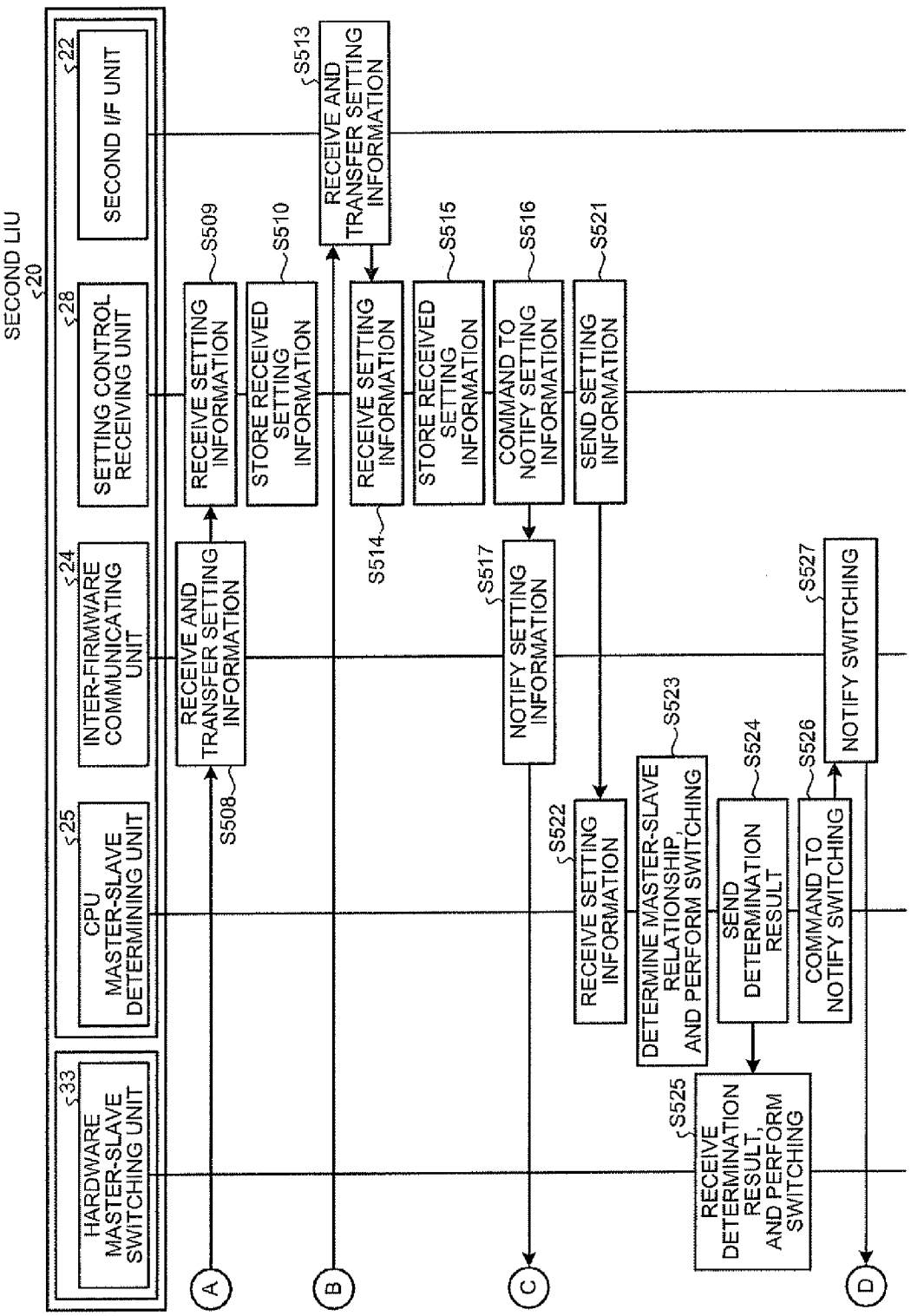

Assume that the process at Step S530 shown in FIG. 5A is complete, the normal operational state comes back in the optical transmission apparatus 100 according to the first embodiment. In this state, when the failure monitoring unit 19 of the first LIU 3 receives and stores therein failure information of the working line from the port group 200 (Step S601), the failure monitoring unit 19 commands the inter-hardware communicating unit 17 to transfer the received failure information to the second LIU 20 (Step S602), and the inter-hardware communicating unit 17 transfers the received failure information to the inter-hardware communicating unit 34 (Step S603).

The inter-hardware communicating unit 34, when receiving the failure information transferred from the inter-hardware communicating unit 17 (Step S604), transfers the failure information to the failure monitoring unit 36 (Step S605). The failure monitoring unit 36 stores therein the failure information received from the first LIU 3 (Step S606).

For example, the failure monitoring unit 19 of the first LIU 3, which is the interface for the working line, when receiving APS information of signal failure (SF), stores therein the SF information while sending the SF information to the failure monitoring unit 36 of the second LIU 20 by inter-hardware communication. The second LIU 20 stores in the failure monitoring unit 36 the failure information received from the first LIU 3, and updates it. As a result, the same failure information is stored in the failure monitoring units 19 and 36.

Concurrently with the reception of the failure information at the failure monitoring unit 19 of the first LIU 3 at Step S601, the interruption trigger detecting unit 18 of the first LIU 3 detects from the ports the same information as the failure information received at and stored in the failure monitoring unit 19. The interruption trigger detecting unit 18 then sends to the interruption receiving unit 13 and the inter-hardware communicating unit 17 an interruption notification notifying that the failure information has been interrupted (Step S607).

The inter-hardware communicating unit 17 transfers the received interruption notification to the inter-hardware communicating unit 34 of the second LIU 20 equipped with a master CPU (Step S608). The inter-hardware communicating unit 34 receives the interruption notification (Step S609), and transfers it to the interruption trigger detecting unit 35 (Step S610).

The interruption trigger detecting unit 35 detects the interruption notification from the inter-hardware communicating unit 34, and sends it to an interruption receiving unit 30 (Step S611). In response to the interruption notification, the interruption receiving unit 30 collects the failure information at the fifth to the eighth ports from the failure monitoring unit 36 of the hardware 31 (Step S612). The interruption receiving unit 30 then notifies the collected failure information to a trigger detecting unit 29 and requests switching (Step S613).

The trigger detecting unit 29 receives the failure information collected by the interruption receiving unit 30, and determines switching based on the received failure information (Step S614). Specifically, the trigger detecting unit 29 determines to switch the working line to the protection line.

The trigger detecting unit 29 notifies the result of the switching determination to a switch controlling unit 27 (Step S615). The switch controlling unit 27, when receiving the result of the switching determination (Step S616), provides a command for controlling switching to a switching control register 32 (Step S617), and the switching control register 32 performs switching according to the command from the switch controlling unit 27 (Step S618). Specifically, the switching control register 32 performs switching at the fifth to the eighth ports according to the command from the switch controlling unit 27, so as to receive an optical signal over the protection line.

The interruption receiving unit 13, when receiving the interruption notification from the interruption trigger detecting unit 18, collects the failure information from the failure monitoring unit 19 of the hardware 14, as in the same way of the interruption receiving unit 30 (Step S619). The interruption receiving unit 13 then notifies the collected failure information to the trigger detecting unit 12 and requests switching (Step S620).

The trigger detecting unit 12 receives the failure information collected by the interruption receiving unit 13, determines switching based on the received failure information (Step S621), and notifies a result of the switching determination to the switch controlling unit 10 (Step S622). The switch controlling unit 10, when receiving the result of the switching determination (Step S623), provides the switching control register 15 with a command for controlling switching (Step S624), and the switching control register 15 performs switching according to the command from the switch controlling unit 10 (Step S625). However, no switching actually occurs on the hardware 14 of the first LIU 3 at Step S530 shown in FIG. 5A, because it has been set as slave hardware.

Assume that the process at Step S530 shown in FIG. 5A is complete and the normal operational state comes back in the optical transmission apparatus 100 according to the first embodiment. In this state, when the second LIU 20 installed with a master CPU is removed, the inter-hardware communicating unit 17 of the first LIU 3 installed with a slave CPU receives information of the removal of the second LIU 20, and provides a notification of the removal of the second LIU 20 to the failure monitoring unit 19 and the interruption trigger detecting unit 18 (Step S701).

The failure monitoring unit 19 stores therein the received notification of the removal as failure information (Step S702). The interruption trigger detecting unit 18 detects the received notification of the removal as an interruption notification of the failure occurrence, and sends the interruption notification to the interruption receiving unit 13 (Step S703).

In response to the interruption notification, the interruption receiving unit 13 collects the failure information from the failure monitoring unit 19 (Step S704), and notifies the collected failure information to the trigger detecting unit 12 (Step S705).

The trigger detecting unit 12 determines switching based on the failure information received from the interruption receiving unit 13 (Step S706). Specifically, based on the information indicating the removal of the second LIU 20 installed with a master CPU, the trigger detecting unit 12 determines switching in the first LIU 3 installed with the slave CPU and the slave hardware. More specifically, the trigger detecting unit 12 shifts the slave CPU to be a master CPU, and the slave hardware to be master hardware.

The setting control receiving unit 11 receives the result of the switching determination from the trigger detecting unit 12, and notifies it to the CPU master-slave determining unit 8 (Step S707). Based on the received result of the switching determination, the CPU master-slave determining unit 8 switches the setting of the CPU containing the firmware 4 from a slave CPU to a master CPU (Step S708).

The CPU master-slave determining unit 8 sends the result of the switching determination to the hardware master-slave switching unit 16 (Step S709). Based on the received result of the switching determination, the hardware master-slave switching unit 16 switches the setting of the hardware 14 from slave hardware to master hardware.

Although the present embodiment describes the removal of the second LIU 20 installed with a master CPU, the similar processes are performed also in the occurrence of failure in the second LIU 20 installed with a master CPU.

Assume that the process at Step S710 shown in FIG. 7 is complete and then only the first LIU 3 is in operational state in the optical transmission apparatus 100 according to the first embodiment. In this state, when the second LIU 20 installed with the CPU set as a master CPU is installed (inserted) again and recovered from the removal, the inter-hardware communicating unit 17 of the first LIU 3 installed with the CPU, shifted to be a master CPU, receives removal recovery information indicating the installation of the second LIU 20, and provides a notification of recovery from the removal of the second LIU 20 to the failure monitoring unit 19 and the interruption trigger detecting unit 18 (Step S801).

The failure monitoring unit 19 stores therein the received removal recovery notification (Step S802). The interruption trigger detecting unit 18 detects the received removal recovery notification as an interruption notification, and sends the interruption notification to the interruption receiving unit 13 (Step S803), and the interruption receiving unit 13 receives the interruption notification (removal recovery information) (Step S804).

The failure monitoring unit 19 commands the inter-hardware communicating unit 17 to transfer all failure information stored in the failure monitoring unit 19 to the second LIU 20 (Step S805). The inter-hardware communicating unit 17 transfers the failure information stored in the failure monitoring unit 19 to the inter-hardware communicating unit 34 of the second LIU 20 (Step S806).

The inter-hardware communicating unit 34 receives all the failure information stored in the failure monitoring unit 19 of the first LIU 3 via the inter-hardware communicating unit 17 (Step S807), and sends it to the failure monitoring unit 36 (Step S808).

The failure monitoring unit 36 stores therein all the failure information received from the inter-hardware communicating unit 34 and having been stored in the failure monitoring unit 19 (Step S809).

When the user I/F unit 2 of the CPU 1 provides a command for resetting the setting stored in the CPU 1, i.e., the setting that the second LIU 20 is set as an interface for the protection line (Step S810), the second I/F unit 22 of the second LIU 20 transfers the setting information to the setting control receiving unit 28 (Step S811).

The setting control receiving unit 28, when receiving the setting information (Step S812), stores therein the received setting information, and collects failure information from the failure monitoring unit 36 (Step S813). In this way, all the failure information is recovered also in the firmware 21.

The setting control receiving unit 28 then commands the inter-firmware communicating unit 24 to provide the first LIU 3 with a recovery completion notification (Step S814). The inter-firmware communicating unit 24 transfers the recovery completion notification to the inter-firmware communicating unit 7 (Step S815).

The inter-firmware communicating unit 7 receives the recovery completion notification from the inter-firmware communicating unit 24, and transfers it to the setting control receiving unit 11 (Step S816). The setting control receiving unit 11 receives and stores therein the recovery completion notification (Step S817). Specifically, the setting control receiving unit 11 stores therein information that the second LIU 20 has been reset as an interface for the protection line, and that the failure information has been completely recovered.

The setting control receiving unit 28 provides the recovery completion notification at Step S814, and also sends to the CPU master-slave determining unit 25 the setting information that the second LIU 20 has been reset as an interface for the protection line (Step S818).

The CPU master-slave determining unit 25 receives the setting information (Step S819), and determines a master-slave relationship of the CPU containing the firmware 21, so as to perform switching (Step S820).

Specifically, because the second LIU 20 has been reset as an interface for the protection line, the CPU master-slave determining unit 25 determines the CPU containing the firmware 21 to be a master CPU. Because the CPU in the LIU is initially set as a master CPU, no switching actually occurs.

Further, the CPU master-slave determining unit 25 sends the determination result to the hardware master-slave switching unit 33 (Step S821). In response to the determination result, the hardware master-slave switching unit 33 performs switching of the hardware 31 (Step S822).

Specifically, because the CPU containing the firmware 21 has been determined to be a master CPU, the hardware master-slave switching unit 33 in the hardware 31 switches the hardware 31 to be master hardware.

The setting control receiving unit 11, when storing therein the recovery completion notification as shown in Step S817, sends to the CPU master-slave determining unit 8 the recovery completion notification including the setting information that the second LIU has been reset as an interface for the protection line (Step S823).

The CPU master-slave determining unit 8 receives the recovery completion notification including the setting information, and determines a master-slave relationship of the CPU containing the firmware 4, so as to perform switching (Step S824).

Specifically, because the second LIU 20 has been reset as an interface for the protection line, the CPU master-slave determining unit 8 determines the CPU containing the firmware 4 to be a slave CPU, and switches the setting of the CPU from a master CPU to a slave CPU.

The CPU master-slave determining unit 8 sends the determination result to the hardware master-slave switching unit 16 (Step S825). In response to the determination result, the hardware master-slave switching unit 16 performs switching of the hardware 14 (Step S826).

Specifically, because the CPU containing the firmware 4 has been determined to be a slave CPU, the hardware master-slave switching unit 16 in the hardware 14 switches the setting of the hardware 14 from master hardware to slave hardware. Accordingly, the normal operational state comes back, which corresponds to processes subsequent to Step S530 shown in FIG. 5A.

Although the present embodiment describes the processes performed in reinstallation of the removed second LIU 20 installed with a master CPU, the similar processes are performed also in recovery from failure in the second LIU 20 installed with a failed master CPU.

According to the first embodiment, between pieces of hardware installed in the redundant LIUs, hardware in one redundant LIU communicates obtained failure information to hardware in the other LIU. This arrangement allows high speed transmission of failure information (e.g., SF or SD) stored in APS bytes, compared with transmission between the CPUs (pieces of firmware) in the redundant LIUs. Thus, switching can be performed quickly.

According to the first embodiment, hardware installed in each of the redundant LIUs stores therein obtained failure information, and failure information received from hardware in a neighboring LIU. This arrangement allows sharing of failure information stored in APS bytes and held in a neighboring LIU, while updating the information to new failure information by faster inter-hardware communication. Thus, switching can be performed quickly and properly. Further, because failure information of a neighboring line card can be stored, switching can be performed quickly and properly even upon occurrence of failure or removal of the neighboring line card.

According to the first embodiment, when a predetermined input section receives line setting information that each of the redundant LIUs is an interface for the working line or the protection line, a CPU in an LIU set as an interface for the protection line is determined to be a master CPU, and a CPU in an LIU set as an interface for the working line is determined to be a slave CPU. The CPU determined to be the master CPU sets: hardware working under the master CPU to be master hardware, and hardware working under the slave CPU to be slave hardware. Further, the CPU determined to be the master CPU controls the hardware set as the master hardware to switch the redundant lines. This arrangement allows the master CPU to dominantly control switching. Thus, switching can be performed quickly and properly.

According to the first embodiment, upon occurrence of failure or removal of the LIU installed with the CPU determined to be the master CPU, the slave CPU is determined to be a new master CPU. This arrangement allows the new master CPU to control switching referring to failure information of a neighboring LIU, which is stored in the hardware working under the new master CPU. Thus, switching can be performed quickly and properly.

According to the first embodiment, upon recovery from failure or removal of the LIU installed with the CPU determined to be the master CPU, the CPU is redetermined to be the master CPU. This arrangement allows the CPU redetermined to be the master CPU to control switching referring to failure information completely recovered from failure information having been stored in the neighboring LIU and received by the hardware working under the master CPU. Thus, switching can be performed quickly and properly.

Figure 6A:
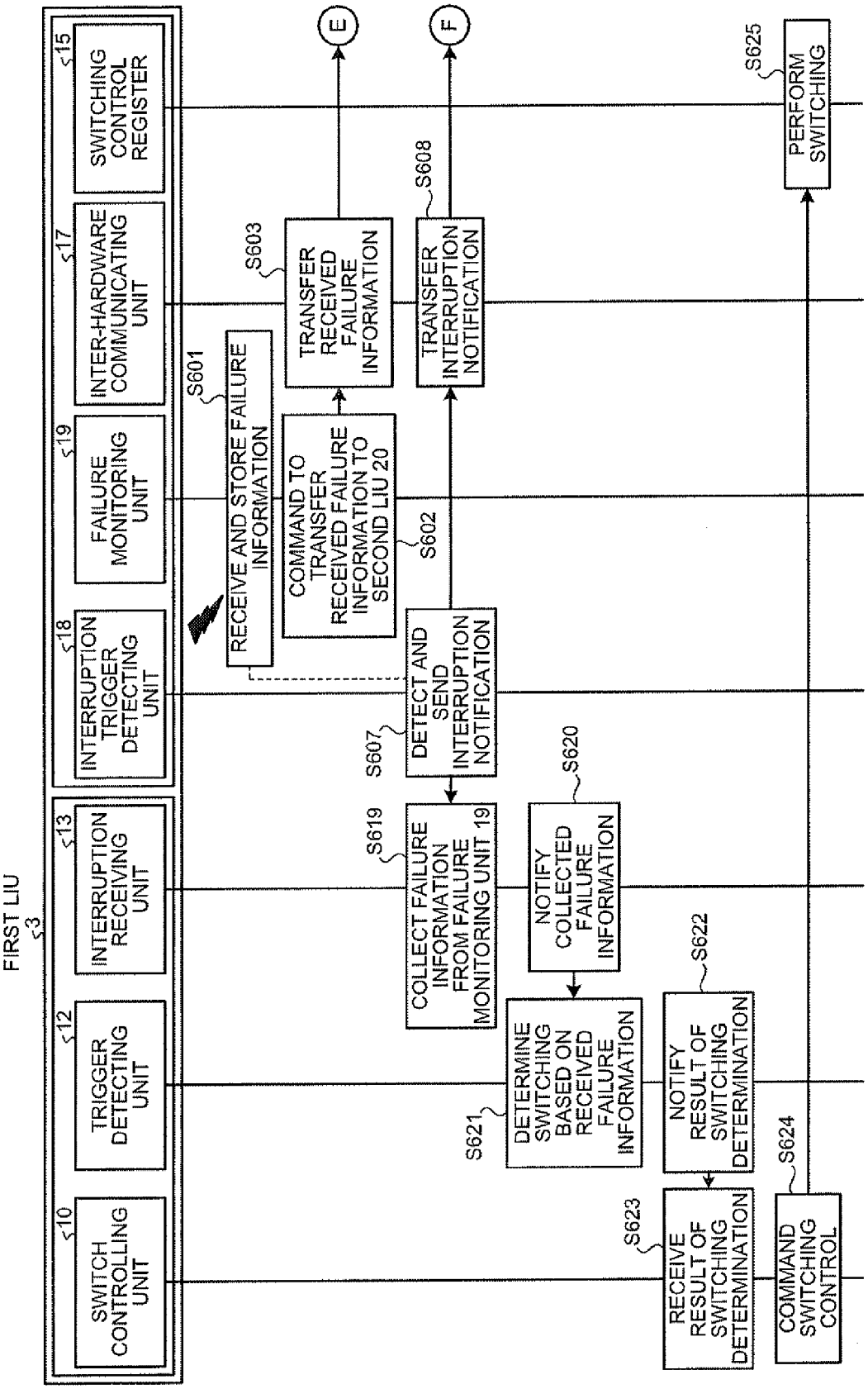
Figure 8A:
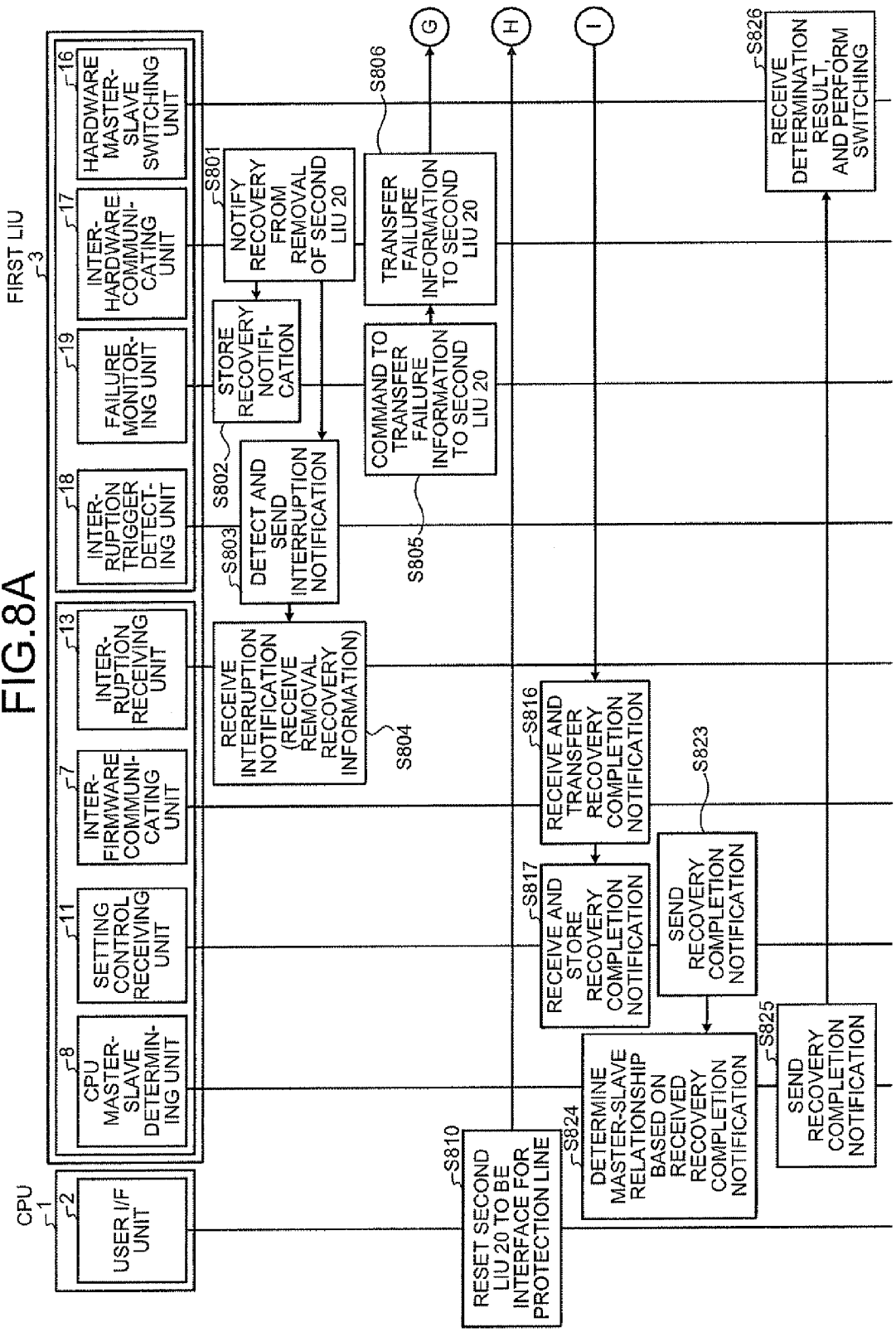
FIG. 8A is a chart of processes from the recovery of an LIU for a protection line to switching control in the optical transmission apparatus shown in FIG. 2.
Figure 9A:
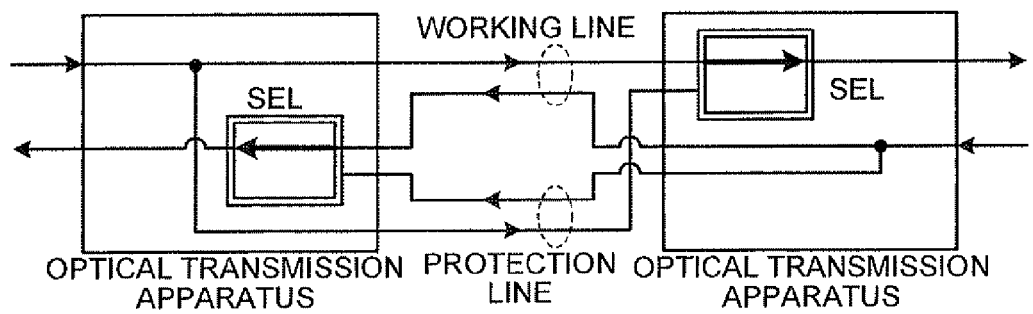
FIGS. 9A to 9D are schematics for explaining 1+1 APS.
Figure 9B:
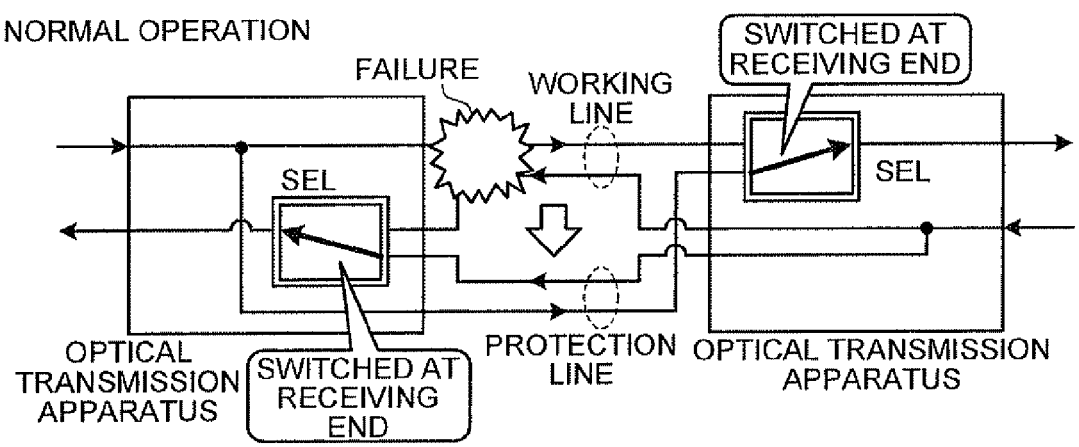
Figure 9C:
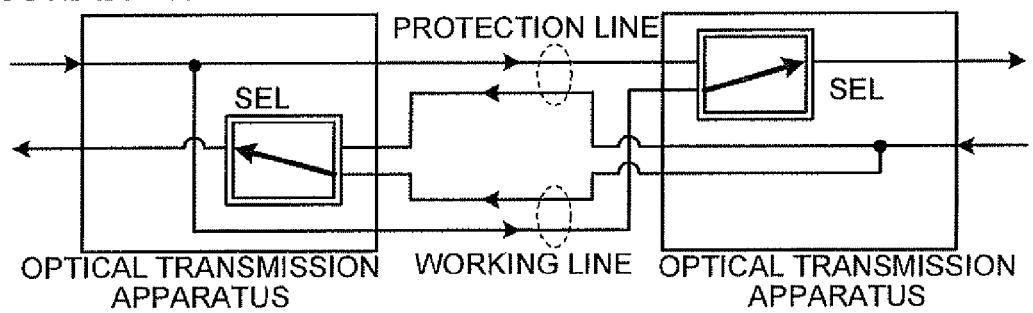
Figure 9D:
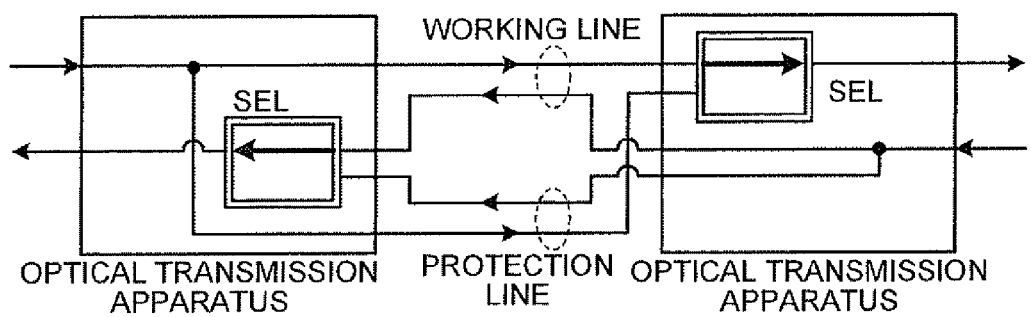
Figure 10A:
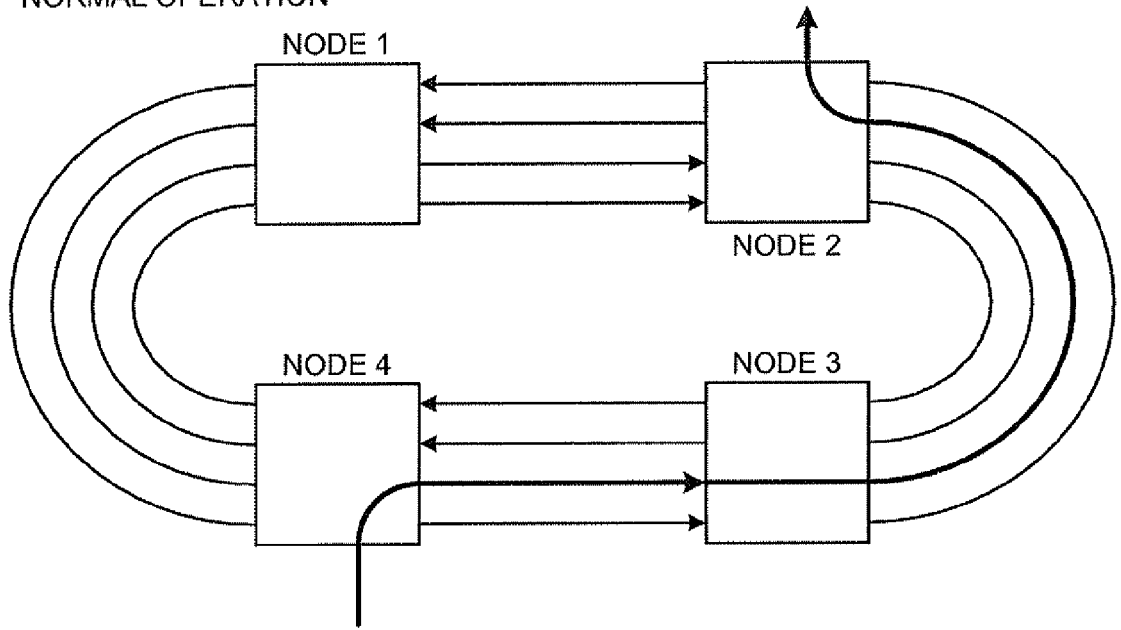
FIGS. 10A and 10B are schematics for explaining BLSR.
Figure 10B:
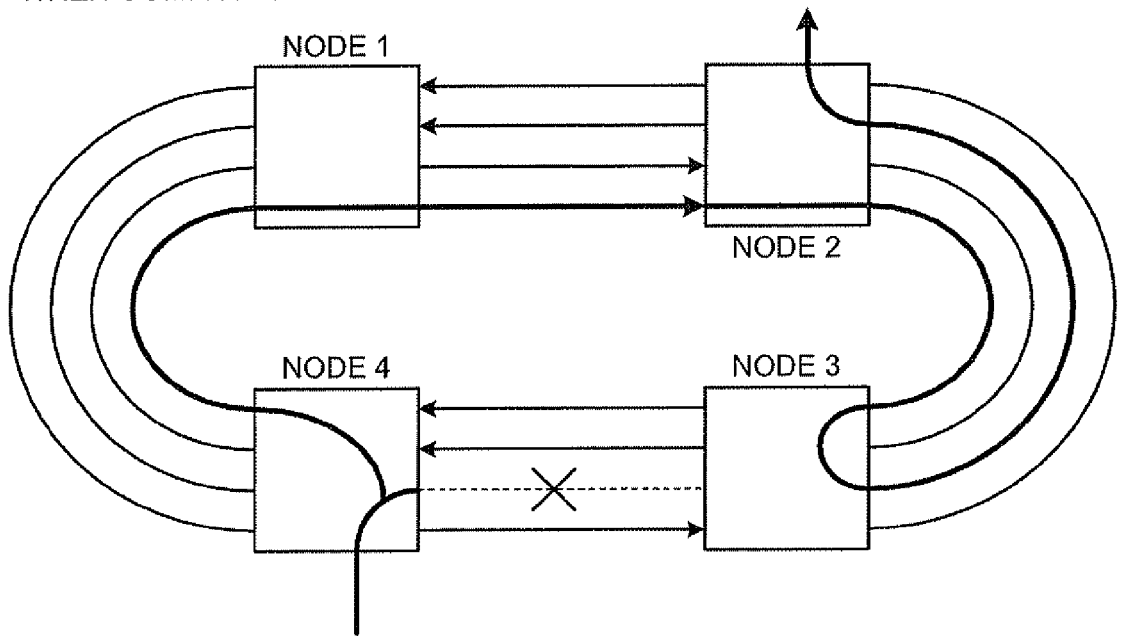
Figure 11:
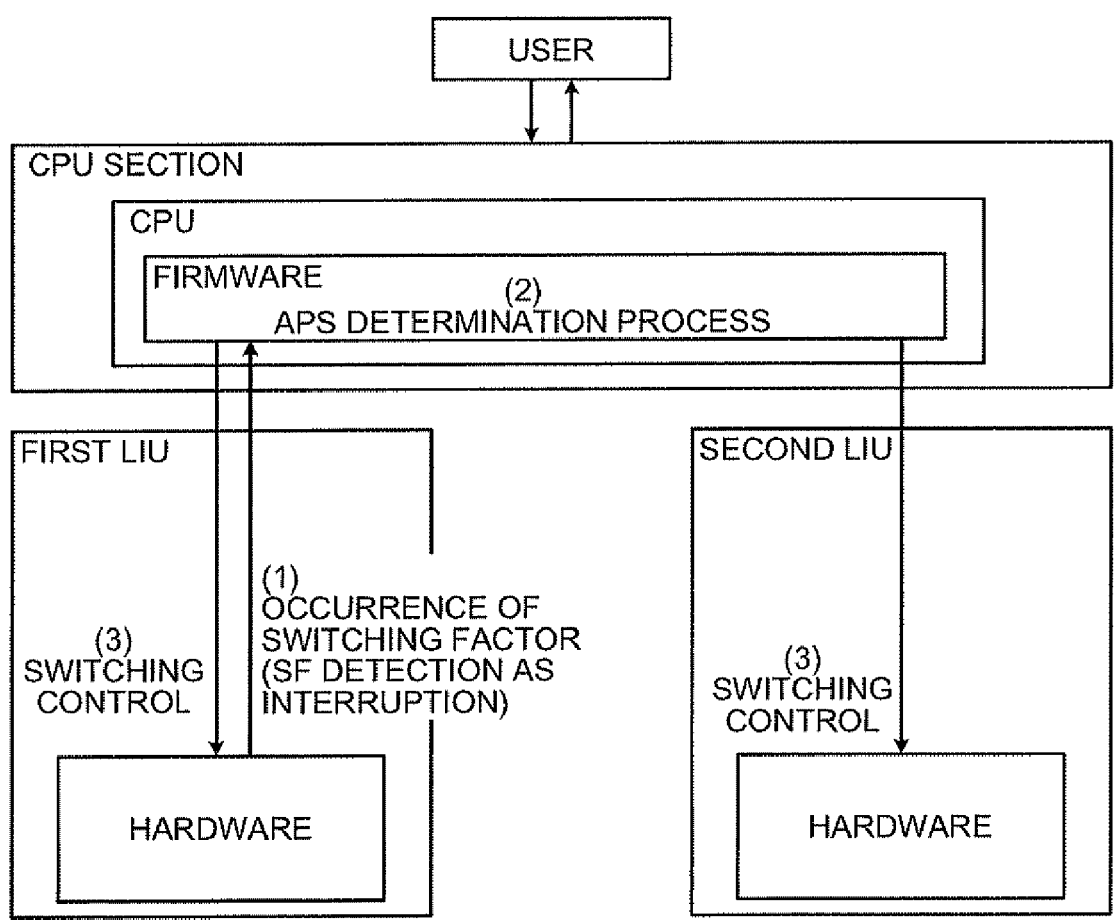
FIG. 11 is a schematic of a centralized CPU architecture.
Figure 12:
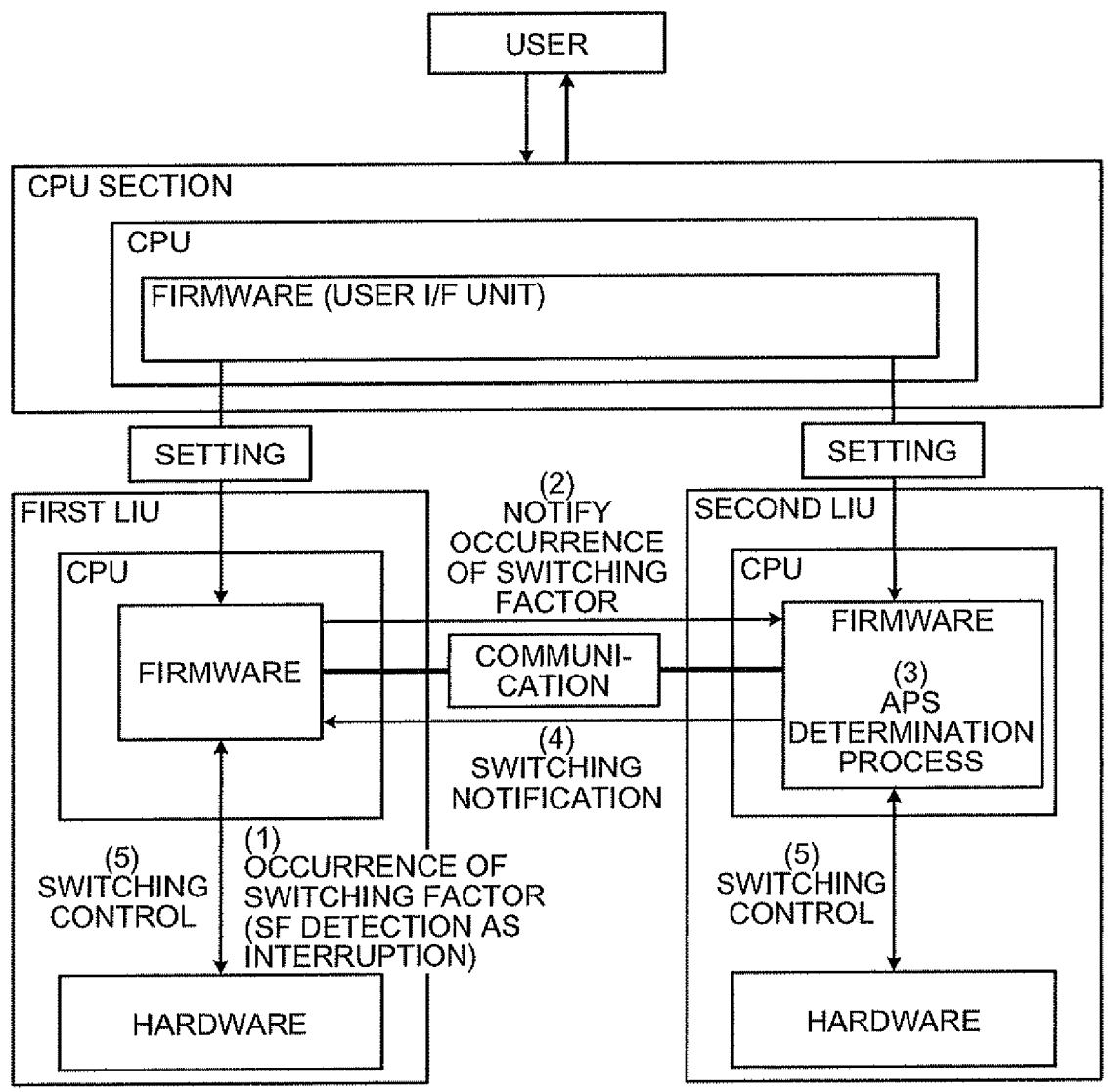
FIG. 12 is a schematic of a distributed CPU architecture.

By inter-hardware communication, in the optical transmission apparatus according to the first embodiment, the processing time shown in FIGS. 6A and 6B starting from concurrent occurrence of failures on a working line to switching control can be reduced to half that of a conventional optical transmission apparatus of a distributed CPU architecture shown in FIG. 12, which starts from the concurrent occurrence of failures on a working line to switching control.

Although the foregoing describes the optical transmission apparatus according to the first embodiment, the present invention may be practiced in various forms other than the first embodiment. The following describes a different arrangement (1) of an optical transmission apparatus according to a second embodiment.

(1) System Configuration

As to the processes described in the first embodiment as being performed automatically, all of or part of the processes may be performed manually (not by receiving user setting information, but by previously setting, for example, an LIU to be an interface for the working line or the protection line depending on an installation position of the LIU). Alternatively, as to the processes described as being performed manually, all of or part of the processes may be performed automatically by known methods. In addition, the processing procedures, specific names, various types of data and parameters, and other kinds of information shown in the embodiment and the drawings may be changed in any way unless otherwise specified.

Further, constituting elements of each apparatus shown in the drawings indicate ideational functions, and their physical arrangements are not necessarily the same as those shown in the drawings. Thus, the arrangement of distributing and integrating the processing units and storing units is not limited to those specifically shown in the drawings (e.g., arrangement shown in FIG. 2), and all of or part of those units may be distributed and integrated concerning functional and physical aspects based on given units, with loads on and usage of the units taken into account. For example, the interruption trigger detecting unit 18 and the failure monitoring unit 19 may be integrated. As to the processing functions implemented in the units, all of or any portion of the functions may be implemented by CPUs and programs interpretable and executable by the CPUs, or may be implemented in hardware using wired logic.

An optical transmission apparatus according to the embodiments of the present invention may be realized by implementing a prepared program on a computer or a workstation. The program may be distributed over a network such as the Internet. Further, the program may be implemented by being recorded to a computer-readable recording medium, such as a hard disk, a flexible disk (FD), a compact disk read only memory (CD-ROM), a magnet optical disk (MO), or a digital versatile disk (DVD), and then by being read out from such a recording medium with a computer.

According to the embodiment of the present invention, between pieces of hardware mounted on the redundant line cards, hardware in one redundant line card communicates obtained failure information to hardware in the other line card. This arrangement allows high speed transmission of failure information included in APS bytes, compared with transmission between CPUs (pieces of firmware) in the redundant line cards. Thus, switching can be performed quickly.

According to the embodiment of the present invention, hardware mounted on each of the redundant line cards stores therein obtained failure information, and failure information received from hardware in a neighboring line card. This arrangement allows sharing of failure information included in APS bytes and held in a neighboring line card, while updating the information to new failure information by faster inter-hardware communication. Thus, switching can be performed quickly. Moreover, upon occurrence of failure or removal of the neighboring line card, the failure information of the neighboring line card can be stored. Thus, switching can also be performed quickly and properly.

According to the embodiment of the present invention, when a predetermined input section receives line setting information that each of the redundant line cards is an interface for the working line or the protection line, a CPU installed in a line card set as an interface for the protection line is determined to be a master CPU, and a CPU installed in a line card set as an interface for the working line is determined to be a slave CPU. The CPU determined to be the master CPU sets: the hardware working under the master CPU to be master hardware; and the hardware working under the slave CPU to be slave hardware. Further, the CPU determined to be the master CPU controls the hardware set as the master hardware to switch the redundant lines. This arrangement allows the master CPU to dominantly control switching. Thus, switching can be performed quickly and properly.

According to the embodiment of the present invention, upon occurrence of failure or removal of the line card installed with the CPU determined to be the master CPU, the slave CPU is determined to be a new master CPU. This arrangement allows the new master CPU to control switching by referring to failure information of a neighboring line card, which is stored in the hardware working under the new master CPU. Thus, switching can be performed quickly and properly.

According to the embodiment of the present invention, upon recovery from failure or removal of the line card installed with the CPU determined to be the master CPU, the CPU is redetermined to be the master CPU. This arrangement allows the redetermined master CPU to control switching, referring to failure information completely recovered from failure information having been stored in the neighboring LIU and received by the hardware working under the master CPU. Thus, switching can be performed quickly and properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission apparatus for transmitting an optical SDH/SONET signal in a ring network, comprising:
a first line card and a second line card, each including a hardware unit, a CPU, and an inter-hardware communicating unit, wherein
the hardware unit obtains failure information on a redundant line including a working line and a protection line,
the CPU determines switching control of the redundant line based on the failure information obtained by the hardware unit, and thereby the hardware unit switches the redundant line based on the switching control determined by the CPU, and
the inter-hardware communicating unit communicates, from the hardware unit of one of the first line card and the second line card to the hardware unit of the other of the first line card and the second line card, the failure information obtained by the hardware of the one of the first line card and the second line card, wherein
each of the first line card and the second line card further includes
a CPU master-slave determining unit that determines, when a predetermined input section receives line setting information that the corresponding line card is an interface for the working line or the protection line, the CPU of the line card set as an interface for the protection line to be a master CPU, and the CPU of the line card set as an interface for the working line to be a slave CPU;
a hardware master-slave setting unit that causes the CPU determined to be the master CPU by the CPU master-slave determining unit to set the hardware working under the master CPU to be master hardware, and the hardware working under the slave CPU to be slave hardware; and
a switch controlling unit that causes the CPU determined to be the master CPU by the CPU master-slave determining unit to control the hardware set as the master hardware by the hardware master-slave setting unit to switch the redundant line.

2. The optical transmission apparatus according to claim 1, wherein
each of the first line card and the second line card includes an obtained failure information storing unit that stores therein the failure information obtained by the hardware unit, and
the inter-hardware communicating unit stores in the obtained failure information storing unit the failure information received from the hardware unit.

3. The optical transmission apparatus according to claim 1, wherein
the CPU master-slave determining unit determines, upon occurrence of failure or removal of the line card installed with the CPU determined to be the master CPU, the slave CPU to be a new master CPU.

4. The optical transmission apparatus according to claim 3, wherein the CPU master-slave determining unit redetermines, upon recovery from failure or removal of the line card installed with the CPU determined to be the master CPU, the CPU to be the master CPU.

* * * * *